US012130568B2

(12) United States Patent
Kubo et al.

(10) Patent No.: US 12,130,568 B2
(45) Date of Patent: Oct. 29, 2024

(54) TONER SUPPLY CONTANER AND MOUNTING UNIT

(71) Applicant: CANON KABUSHIKI KAISHA, Tokyo (JP)

(72) Inventors: Yukio Kubo, Tokyo (JP); Hiroyuki Munetsugu, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/133,040

(22) Filed: Apr. 11, 2023

(65) Prior Publication Data

US 2023/0244157 A1 Aug. 3, 2023

Related U.S. Application Data

(63) Continuation of application No. PCT/JP2021/039029, filed on Oct. 15, 2021.

(30) Foreign Application Priority Data

Nov. 10, 2020 (JP) ................................ 2020-187416

(51) Int. Cl.
*G03G 15/08* (2006.01)
*G03G 15/00* (2006.01)
(Continued)

(52) U.S. Cl.
CPC ..... *G03G 15/0886* (2013.01); *G03G 15/0863* (2013.01); *G03G 15/0874* (2013.01);
(Continued)

(58) Field of Classification Search
CPC ........... G03G 15/0886; G03G 15/0863; G03G 15/0874; G03G 15/80; G03G 21/1619;
(Continued)

(56) References Cited

U.S. PATENT DOCUMENTS

2007/0147902 A1 6/2007 Taguchi et al.
2007/0230999 A1 10/2007 Shimomura
(Continued)

FOREIGN PATENT DOCUMENTS

JP H08-30084 A 2/1996
JP 2004-161371 A 6/2004
(Continued)

OTHER PUBLICATIONS

International Search Report and Written Opinion for International Patent Application No. PCT/JP2021/039029.
(Continued)

*Primary Examiner* — Joseph S Wong
(74) *Attorney, Agent, or Firm* — Venable LLP

(57) ABSTRACT

A toner supply container includes a memory portion, a container portion, a discharging portion, and a shutter. The memory portion includes a memory for storing information and an electrode having an exposed surface. The discharging portion is disposed on one end side of the container portion with respect to a first direction. The shutter is configured to rotate around an axis extending in the first direction. As viewed along the first direction, the exposed surface is disposed inside of an imaginary circle that passes through an outer end of the shutter with the axis as a center of the imaginary circle.

23 Claims, 23 Drawing Sheets

(51) Int. Cl.
*G03G 21/16* (2006.01)
*G03G 21/18* (2006.01)

(52) U.S. Cl.
CPC ......... *G03G 15/80* (2013.01); *G03G 21/1619* (2013.01); *G03G 21/1647* (2013.01); *G03G 21/1652* (2013.01); *G03G 21/1867* (2013.01); *G03G 21/1871* (2013.01); *G03G 21/1875* (2013.01); *G03G 21/1878* (2013.01); *G03G 21/1885* (2013.01)

(58) Field of Classification Search
CPC ........... G03G 21/1647; G03G 21/1652; G03G 21/1867; G03G 21/1871; G03G 21/1875; G03G 21/1878; G03G 21/1885
See application file for complete search history.

(56) References Cited

U.S. PATENT DOCUMENTS

| | | | | |
|---|---|---|---|---|
| 2009/0263164 | A1* | 10/2009 | Koeda | G03G 15/0855 399/262 |
| 2009/0297214 | A1 | 12/2009 | Chadani | |
| 2009/0297215 | A1 | 12/2009 | Munetsugu | |
| 2010/0316414 | A1 | 12/2010 | Saito et al. | |
| 2011/0200353 | A1 | 8/2011 | Kubo | |
| 2011/0280621 | A1 | 11/2011 | Suzuki | |
| 2011/0311272 | A1 | 12/2011 | Nittani | |
| 2012/0076538 | A1 | 3/2012 | Kashiide | |
| 2015/0118890 | A1 | 4/2015 | Oshikawa | |
| 2015/0139684 | A1 | 5/2015 | Nakazawa | |
| 2015/0227110 | A1 | 8/2015 | Yoshimura | |
| 2015/0253723 | A1 | 9/2015 | Morioka | |
| 2017/0010580 | A1 | 1/2017 | Yoshimura | |
| 2017/0261926 | A1 | 9/2017 | Kashiide | |
| 2017/0261927 | A1 | 9/2017 | Sato | |
| 2018/0067452 | A1 | 3/2018 | Yoshimura | |
| 2018/0321637 | A1 | 11/2018 | Sato | |
| 2019/0171157 | A1 | 6/2019 | Yoshimura | |
| 2019/0179258 | A1 | 6/2019 | Kashiide | |
| 2019/0196361 | A1 | 6/2019 | Kyotani | |
| 2019/0258202 | A1 | 8/2019 | Kamoshida | |
| 2019/0369551 | A1 | 12/2019 | Yoshimura | |
| 2020/0142353 | A1 | 5/2020 | Sato | |
| 2020/0225616 | A1 | 7/2020 | Yoshimura | |
| 2020/0249623 | A1 | 8/2020 | Sato | |
| 2020/0409304 | A1 | 12/2020 | Kashiide | |
| 2021/0109479 | A1 | 4/2021 | Kubo | |
| 2021/0116837 | A1 | 4/2021 | Chick et al. | |
| 2021/0263467 | A1 | 8/2021 | Sato | |
| 2021/0311431 | A1 | 10/2021 | Kashiide | |
| 2021/0405583 | A1 | 12/2021 | Yoshimura | |
| 2022/0035307 | A1 | 2/2022 | Munetsugu | |
| 2022/0075312 | A1 | 3/2022 | Ozaki | |
| 2022/0155722 | A1 | 5/2022 | Kashiide | |
| 2022/0197211 | A1 | 6/2022 | Sato | |
| 2022/0404738 | A1 | 12/2022 | Toba et al. | |
| 2022/0413414 | A1 | 12/2022 | Ozaki | |
| 2023/0017354 | A1 | 1/2023 | Ozaki | |
| 2023/0031856 | A1 | 2/2023 | Munetsugu | |
| 2023/0093103 | A1 | 3/2023 | Yoshimura | |
| 2023/0096202 | A1 | 3/2023 | Sato | |
| 2023/0176503 | A1 | 6/2023 | Fukui | |
| 2023/0185234 | A1 | 6/2023 | Kashiide | |
| 2023/0205114 | A1 | 6/2023 | Ozaki | |
| 2023/0205129 | A1 | 6/2023 | Suetsugu | |

FOREIGN PATENT DOCUMENTS

| | | | |
|---|---|---|---|
| JP | 2008-224783 | A | 9/2008 |
| JP | 2012-022119 | A | 2/2012 |
| JP | 2012-226289 | A | 11/2012 |
| JP | 2013-113946 | A | 6/2013 |
| JP | 2014-174371 | A | 9/2014 |
| JP | 2017-173676 | A | 9/2017 |
| TW | 201423290 | A | 6/2014 |
| WO | 2020/046338 | A1 | 5/2020 |

OTHER PUBLICATIONS

Jan. 25, 2024 Office Action in Taiwanese Patent Application No. 110138557.
Co-pending U.S. Appl. No. 18/142,175, filed May 2, 2023.
Co-pending U.S. Appl. No. 18/201,828, filed May 25, 2023.
Co-pending U.S. Appl. No. 18/207,819, filed Jun. 9, 2023.
Mar. 12, 2024 Office Action in Japanese Patent Application No. 2020-187416.
Apr. 24, 2024 Office Action in Chinese Patent Application No. 202180075078.8 (with English translation).
Aug. 30, 204 Extended Search Report in European Patent Application No. 21 891 617.9.

* cited by examiner (a)

(b)

(a)

(b)

(a)

(b)

(a)

(b)

(a)

(b)

(a)

(b)

(a)

(b)

(a)

(b)

(c)

(d)

(a)

(b)

TONER SUPPLY CONTANER AND MOUNTING UNIT

TECHNICAL FIELD

The present invention relates to a toner supply container for use with an image forming apparatus for forming an image on a recording material and a mounting unit for use with the toner supply container.

BACKGROUND ART

In general, an image forming apparatus of an electrophotographic type forms an image by transferring, onto a transfer material as a transfer medium, a toner image formed on a surface of a photosensitive drum. As an example of such an image forming apparatus, an image forming apparatus of a toner supply type has been known.

In Japanese Laid-Open Patent Application No. H08-30084, a constitution in which a toner supply box for supplying toner is mounted in an image forming apparatus and toner is supplied is described. In International Publication No. 2020/046338, a constitution in which a supply device for supplying toner is provided with a memory device is described.

SUMMARY OF THE INVENTION

Problems to be Solved by the Invention

An object of the present invention is to provide a form of a toner supply container.

Means for Solving the Problem

One of the inventions according to the present application is the following. A toner supply container comprising: a memory portion including a memory for storing information and an electroconductive portion including a first electrode electrically connected to the memory; a container portion for accommodating toner; a discharging portion provided on one end side of the container with respect to a first direction and including a discharge opening which opens toward a direction crossing the first direction and which is for permitting discharge of the toner; and a shutter configured to be rotated around a first axis extending in the first direction and so as to move between a closed position where the shutter covers the discharge opening and a retracted position where the shutter is retracted from the closed position, wherein the first electrode has a first exposed surface exposed to an outside and is provided so that the first exposed surface faces the first direction, and wherein as viewed along the first direction, the first exposed surface is disposed inside an imaginary circle passing through an outer end of the shutter with the first axis as a center.

Effect of the Invention

According to the present invention, it is possible to provide a form of the toner supply container. Further, it is possible to provide a form of a mounting unit.

EMBODIMENTS FOR CARRYING OUT THE INVENTION

Figure 1:
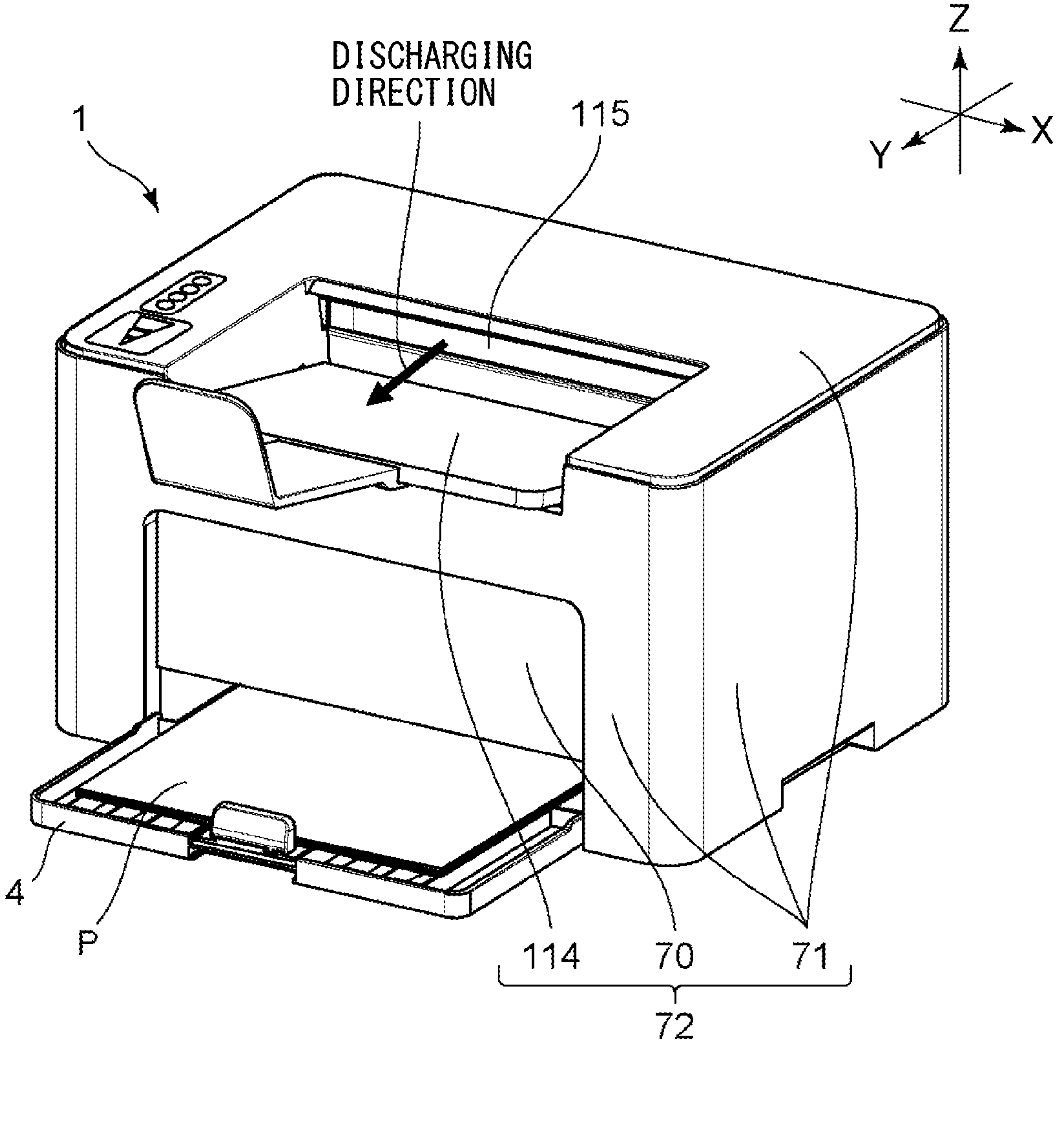
FIG. 1 is a perspective view of an image forming apparatus.

In the following, with reference to the drawings, embodiments for carrying out this invention will be exemplarily described specifically on the basis of the embodiments. However, dimensions, materials, shapes of constituent components described in the embodiments, and relative arrangements of these constituent parts should be appropriately changed depending on constitutions of devices (apparatuses) to which the invention is applied and on various conditions. That is, the scope of this invention is not intended to be limited to the following embodiments. Further, in the drawings used for the following description, for explanation, the components or a part of the components are shown in an omitted manner or in a simplified manner.

Embodiment 1

[General Constitution of Image Forming Apparatus]

A general constitution of an image forming apparatus 1 in this embodiment will be described. The image forming apparatus 1 of this embodiment is a monochromatic laser beam printer using an electrophotographic process and forms an image on a recording material P with developer (toner) depending on image information sent from an external device such as a personal computer. Recording paper, label paper, an OHP sheet, a cloth, and the like are examples of recording material P.

Further, in the following description, a height direction (direction opposite to the direction of gravitation) of the image forming apparatus 1 in the case where the image forming apparatus 1 is installed on a horizontal surface is referred to as Z direction. A direction which crosses the Z direction and which is parallel to a rotational axis direction (main scan direction) of a photosensitive drum 411 described later is referred to as X direction. A direction crossing the X direction and the Z direction is referred to as Y direction. The X direction, the Y direction, and the Z direction may preferably cross perpendicularly each other. For convenience, in the X direction, a plus side is called a right(-hand) side and a minus side is called a left(-hand) side, and in the Y direction, a plus side is called a front side or a front surface side and a minus side is called a rear side or a rear surface side, and in the Z direction, a plus side is called an upper side and a minus side is called a lower side. In this embodiment, the Z direction is parallel to a vertical direction, and the X direction and the Y direction are parallel to a horizontal direction.

Figure 2:
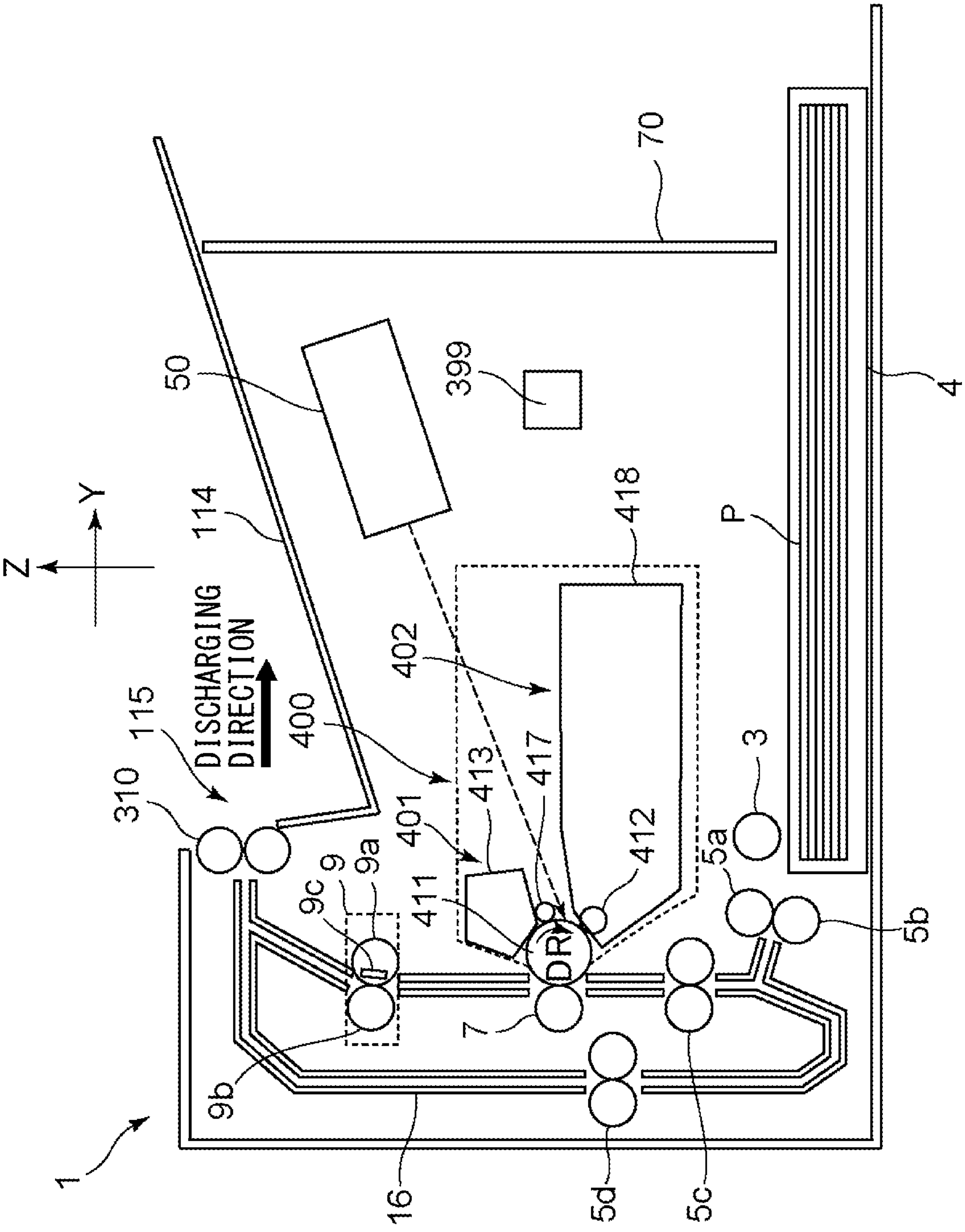
FIG. 2 is a view for illustrating an inside structure of the image forming apparatus.

FIG. 1 shows a perspective view of the image forming apparatus 1, and FIG. 2 is a view for illustrating an internal structure of the image forming apparatus 1 as viewed from the X direction (rotational axis direction of the photosensitive drum 411). FIG. 2 principally shows members relating to an image forming process. In FIG. 1, the image forming apparatus 1 includes a feeding tray 4 in which recording materials P are accommodated and a discharging tray 114 on which discharged recording materials P are stacked. The feeding tray 4 is capable of being pulled out in the Y direction, and a user is capable of supplying (replenishing) the recording materials P to the feeding tray 4. The recording materials P which are fed from the feeding tray 4 and on which images are formed are discharged from a discharge opening 115 toward a discharging direction (Y direction) indicated in FIG. 1, and are stacked on the discharging tray 114.

A front cover 70 is provided at a part of an end surface (part of a front surface) of the image forming apparatus 1 on a downstream side of the discharging direction. A side surface or a top surface of the image forming apparatus 1 which is a part of the front surface other than a place where the front cover 70 is provided with an outer casing cover 71. The front cover 70, the outer casing cover 71, and the above-described discharging tray 114 form together a casing of the image forming apparatus 1. Here, the casing is a member covering entirety of the image forming apparatus 1 and includes a process member such as a scanner unit 50 (described later) inside thereof. The above-described discharge opening 115 is an opening formed at a part of the casing, and the recording material P passes through this opening and is discharged to outside of the image forming apparatus 1.

The image forming apparatus 1 includes an image forming portion 400 including a photosensitive unit 401 provided with the photosensitive drum 411 and a charging roller (charging member) 417, and a developing unit 402 provided with a developing roller 412 and an accommodating portion 418. The photosensitive drum 411 is an image bearing member for bearing an electrostatic latent image. The developing roller 412 is a developer carrying member for carrying toner as developer.

Using FIG. 2, a flow of the image forming operation for the recording material P will be described. When image information is sent to the image forming apparatus 1, on the basis of a print start signal, the photosensitive drum 1, which is a rotatable member, is rotationally driven in an arrow DR direction at a predetermined peripheral speed (process speed). The scanner unit 50 irradiates the photosensitive drum 411 with laser light on the basis of inputted image information. The scanner unit 50 includes a laser oscillator, a polygon mirror and lenses for irradiating the photosensitive drum 411 with the laser light, a scanner motor for rotating the polygon mirror, and a frame for supporting these members. The photosensitive drum 411 is electrically charged in advance by the charging roller 417, and the electrostatic latent image is formed on the photosensitive drum 411 by irradiating the photosensitive drum 411 with the laser light. Thereafter, the toner accommodated in the accommodating portion 418 is carried to the photosensitive drum 411 by the developing roller 412, whereby this electrostatic latent image is developed, and a toner image is formed on the photosensitive drum 411.

In parallel to the above-described image forming process, the recording material P is fed from the feeding tray 4. On a feeding passage of the image forming apparatus 1, a pick-up roller 3, a feeding roller 5*a*, and a conveying roller pair 5*c* are provided. The pick-up roller 3 contacts an uppermost one of the recording materials P accommodated in the feeding tray 4 and feeds the recording material P by rotation of the roller itself. The feeding roller 5*a* and a separation roller 5*b* press-contacted thereto form a separation nip. In the case where a plurality of sheets of the recording materials P are fed to the separation nip by the influence of a frictional force between the recording materials P, the feeding roller 5*a* and the separation roller 5*b* separates the plurality of recording materials P and feed only the recording material P positioned in an uppermost position toward a downstream side.

The recording material P fed from the feeding tray 4 is conveyed toward a transfer roller 7 by the conveying roller pair 5*c*. To the transfer roller 7, a transfer bias is applied, so that the toner image formed on the photosensitive drum 411 is transferred onto the recording material P. The recording material P on which the toner image is transferred by the transfer roller 7 is subjected to a heating and pressing processing by a fixing device 9, so that the toner image is fixed on the recording material P. The fixing device 9 is constituted by a heating roller 9*a* in which a fixing heater 9*c* is incorporated and a pressing roller 9*b* urged toward the heating roller 9*a*. Further, the recording material P on which the toner image is fixed is discharged onto the discharging tray 114 by a discharging roller pair 310.

In the case where images are formed on both sides of the recording material P, the discharging roller pair 310 subjects the recording material P on which first side the image is formed to switch-back, and thus guides the recording material P to a double-side feeding passage 16. The recording material P guided to the double-side feeding passage 16 is conveyed again toward the transfer 7 by a double-side conveying roller pair 5*d*. The recording material P is, after the image is formed on a second side, discharged onto the discharging tray 114 by the discharging roller pair 310.

Further, the toner remaining on the photosensitive drum 411 after the toner image is transferred onto the recording material P is removed by a cleaning unit 413.

The image forming apparatus is provided with a CPU 399 as a controller.

[Arrangement and Constitution of Supplying Portion]

Next, using FIG. 3, FIG. 4, part (a) of FIG. 5, and part (b) of FIG. 5, a supplying portion 200 will be described.

The image forming apparatus 1 is provided with the supplying portion 200 to which a user or a service person is capable of supplying the toner from outside without demounting the accommodating portion 418 from the casing in the case where a remaining toner amount in the accommodating portion 418 becomes small. A constitution in which a toner pack 10 (described later) is detachably mountable to the supplying portion 200 is employed. The image forming apparatus 1 in this embodiment is capable of supplying the toner to the accommodating portion 418 through the supplying portion 200 without removing the image forming portion 400 from the casing.

Figure 3:
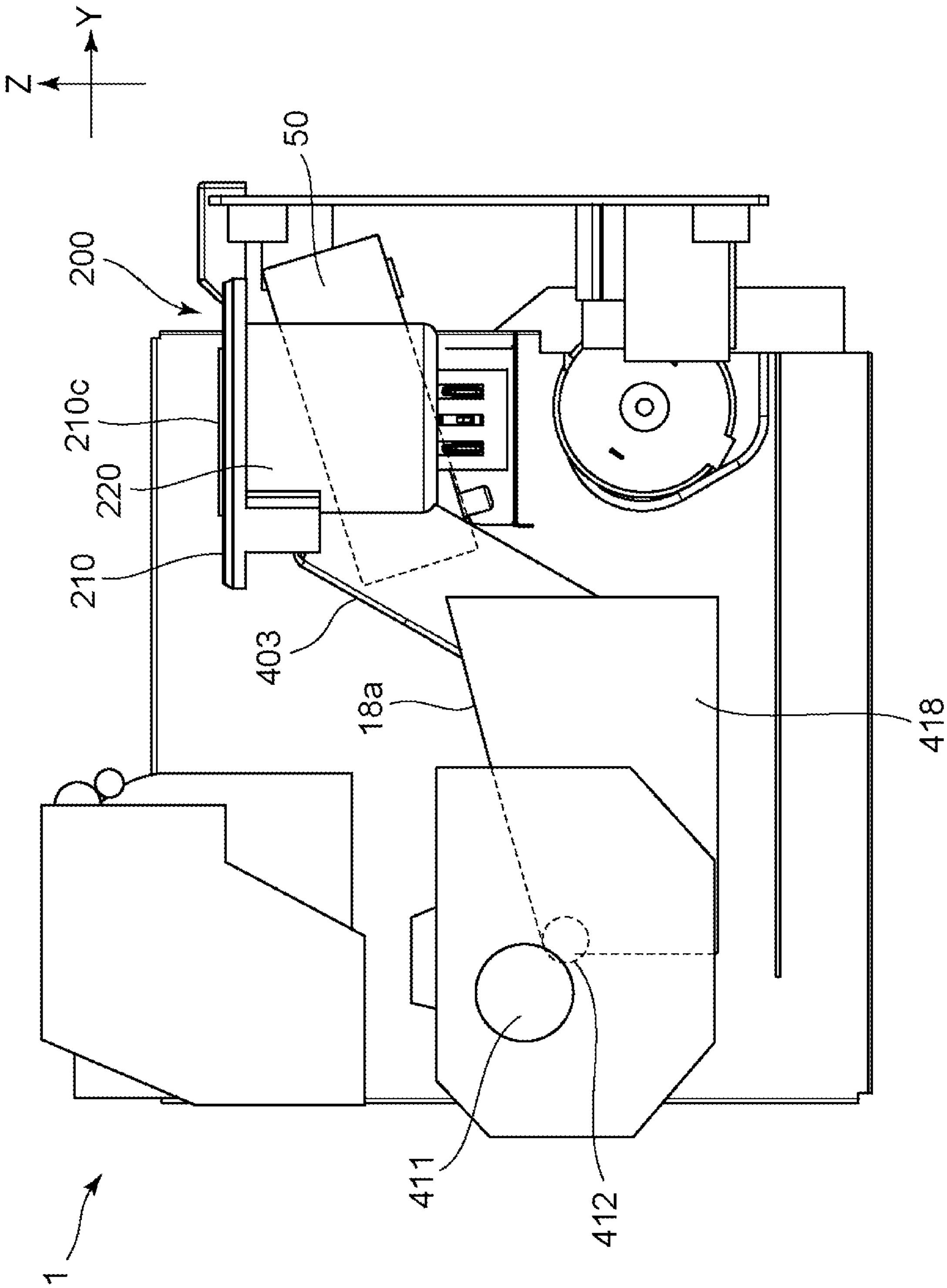
FIG. 3 is a side view of the image forming apparatus for illustrating arrangement of a supplying portion.

FIG. 3 is a side view of the image forming apparatus 1 for illustrating arrangement of the supplying portion 200. FIG. 3 is a left-hand side view of the image forming apparatus 1 when viewed along a rotational axis direction of the photosensitive drum 411. In FIG. 3, a part of the outer casing cover 71 is omitted, so that an inside of the image forming apparatus 1 is shown. The supplying portion 200 is provided with a mounting portion 210 on which the toner pack 10 (not shown in FIG. 3) is mounted, a toner receiving portion 220, a supply path portion 403 connecting the accommodating portion 418 and the toner receiving portion 220.

The mounting portion 210 is disposed on a top surface portion 340 described later and in which a mounting hole 210*c* in which the toner pack 10 is mounted is formed. The toner is moved from the toner pack 10 mounted in the mounting hole 210*c* to the toner receiving portion 220 and the supply path portion 403 in that order, and is finally supplied to the accommodating portion 418.

Figure 4:
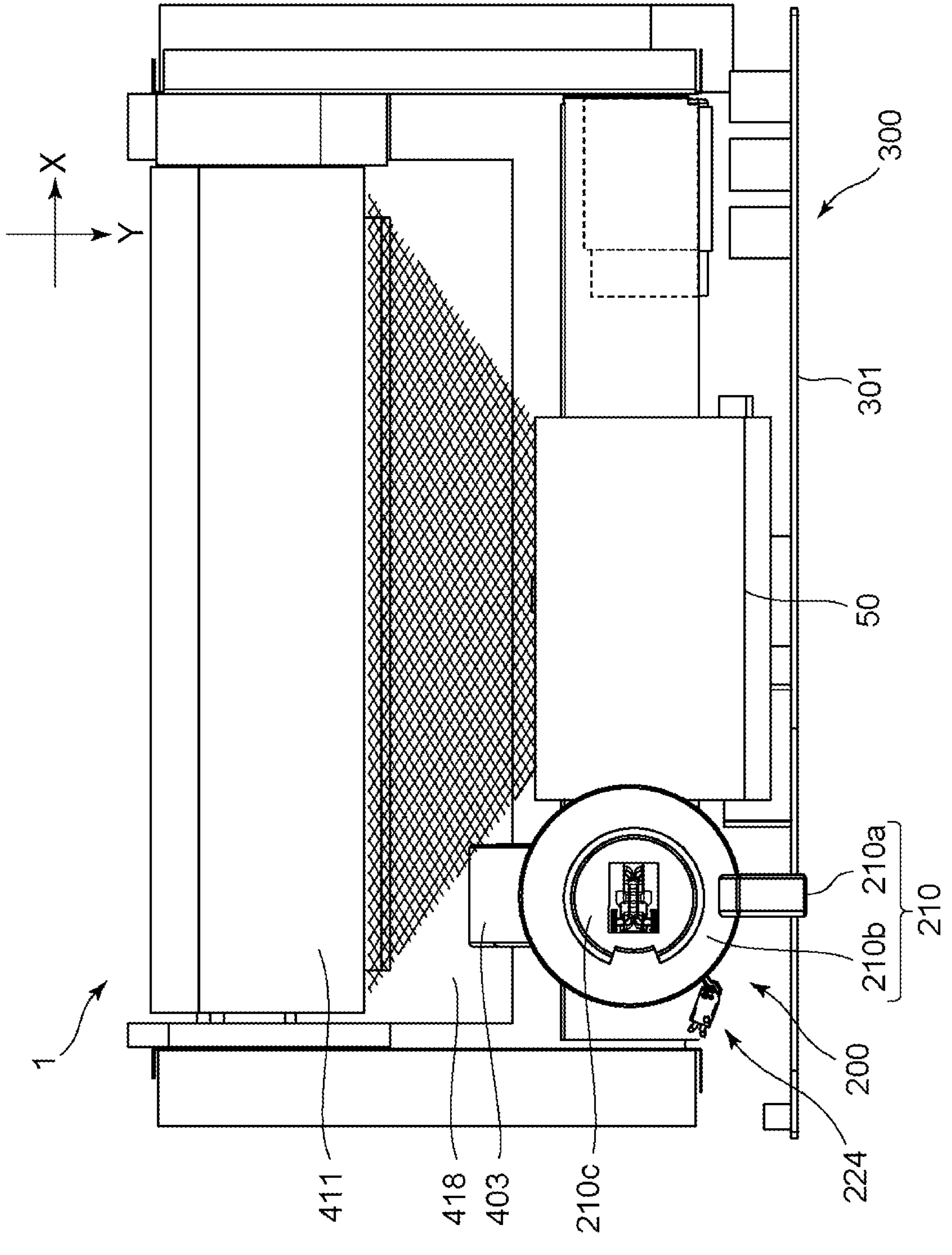
FIG. 4 is a top (plan) view of the image forming apparatus for illustrating the arrangement of the supplying portion.

FIG. 4 is a side view of the image forming apparatus 1 for illustrating the arrangement of the supplying portion 200. FIG. 4 is a top (plan) view of the image forming apparatus 1 from which the outer casing cover 71 is removed. As described above, in the mounting portion 210, the mounting hole 210*c* is formed. Further, the mounting portion 210 is provided with a ring portion 210*b* disposed so as to surround the mounting hole 210*c* and a gripping portion 210*a* connected to the ring portion 210*b*. As shown in FIG. 4, a width of the supplying portion 200 with respect to the X direction is shorter (narrower) than a width of the accommodating portion 418 with respect to the X direction. The supplying portion 200 is disposed while avoiding a laser irradiation region (lattice-like hatched portion in FIG. 4) of the laser light emitted from the scanner unit 50.

Figure 5:
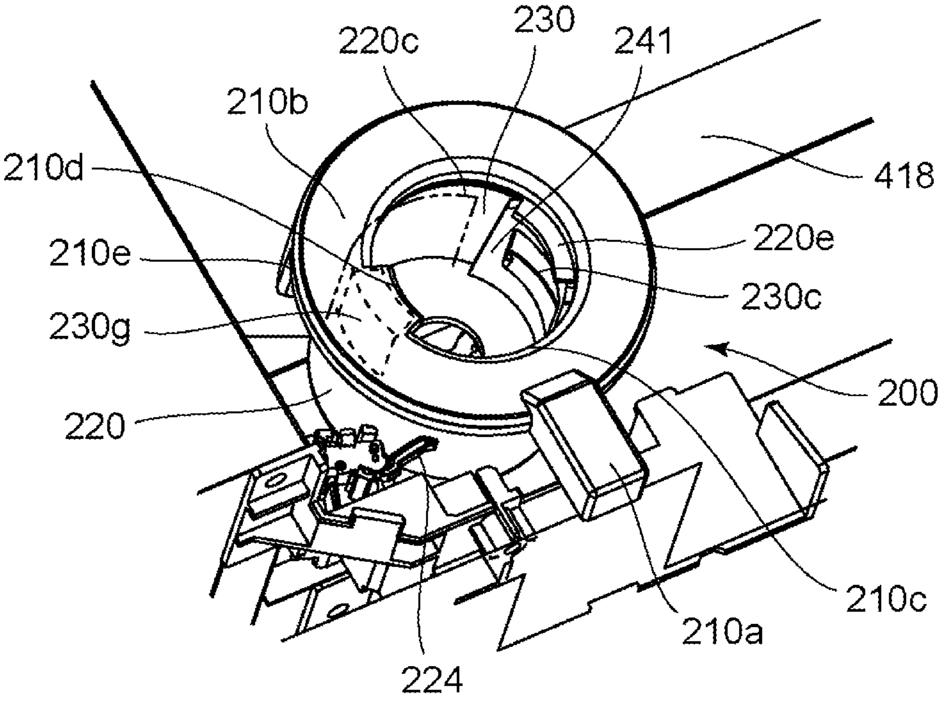
FIG. 5 includes enlarged perspective views of the supplying portion.
Figure 5:
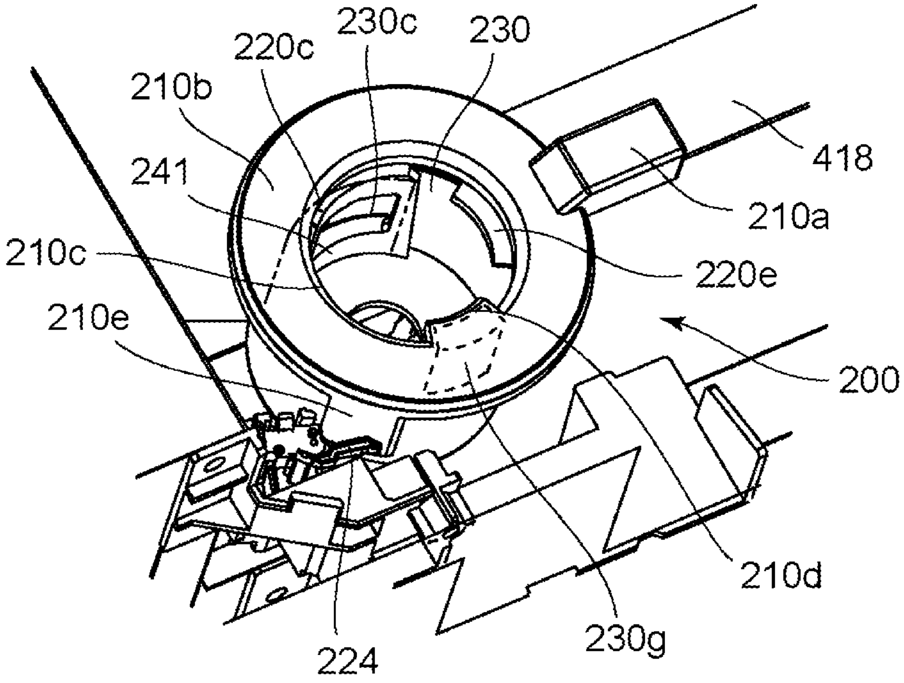

FIG. 5 includes enlarged perspective views of the supplying portion 200. Part (a) of FIG. 5 is a view showing a state in which the gripping portion 210*a* is positioned in an initial position, and part (b) of FIG. 5 is a view showing a state in which the gripping portion 210*a* is positioned in a supplying position.

On cylindrical-shaped an inner wall of the toner receiving portion 220, a receiving opening 220*c* connected to the supply path portion 403 is formed. The toner passes from the toner receiving portion 220 through this receiving opening 200*c* and is guided to the supply path portion 403, and thereafter, passes through the supply path portion 403 and is accommodated in the accommodating portion 418.

In part (a) of FIG. 5, the receiving opening 220*c* formed in the toner receiving portion 220 is closed by a receiving portion shutter 230, and is not actually seen, and therefore, is indicated by a dotted line. The receiving portion shutter 230 is a cylindrical-shaped member concentric with the toner receiving portion 220 and is provided inside the toner receiving portion 220. In the receiving portion shutter 230, a shutter opening 230*c* for permitting passing of the toner is formed, but is not actually seen, and therefore, is indicated by a dotted line. At a periphery of the shutter opening 230*c*, a receiving seal 241 is disposed. In part (a) of FIG. 5, the receiving opening 220*c* and the shutter opening 230*c* are in deviated positions, and therefore, the receiving opening 220*c* is blocked.

In this embodiment, a constitution in which even in the case where the mounting portion 210 is rotated in a state in which the toner pack 10 is not mounted, the receiving portion shutter 230 is prevented from rotating is employed. On the other hand, when the toner pack 10 is mounted, an engaging projection 210*d* of the mounting portion 210 and a transmitting portion 230*g* of the receiving portion shutter 230 engage with a shutter member 11 for the toner pack 10 described later. By that, the user grips of the gripping portion 210*a* and rotates the gripping portion 210*a* by about 90° from a state of part (a) of FIG. 5 to a state of the part (b) of FIG. 5, so that the receiving portion shutter 230 can be rotated inside the toner receiving portion 220.

In part (b) of FIG. 5, the receiving opening 220*c* and the shutter opening 230*c* are in overlapping positions, and therefore, the receiving opening 220*c* is opened and is in a state in which the toner can be supplied through the receiving opening 220*c*.

When the image is formed on the recording material P, the toner is stirred in the accommodating portion 418 by an unshown stirring member, so that there is a need to block the receiving opening 220*c* so that the toner does not leak out through the receiving opening 220*c*. Accordingly, during image formation, the gripping portion 210*a* is moved to the position shown in part (a) of FIG. 5. This position is called an initial position of the gripping portion 210*a*. On the other hand, when the toner is supplied from the toner pack 10 to the accommodating portion 418, there is a need to open the receiving opening 220*c*. Accordingly, during toner supply, the gripping portion 210*a* is moved to the position shown in part (b) of FIG. 5. This position is called a supplying position of the gripping portion 210*a*.

The image forming apparatus 1 is provided with a lever position detecting sensor 224. The mounting portion 210 is provided with a portion-to-be-detected 210*e* contacting the lever position sensor 224. When the gripping portion 210*a* is in the supplying position, the portion-to-be-detected contacts the lever position sensor 224. As a result thereof, it is possible to detect that the lever 210*a* is in the supplying position. When the gripping portion 210*a* is in the initial position, the portion-to-be-detected 210*e* is separated from the lever position sensor 224.

The toner receiving portion 220 is provided with a base supporting portion 220*e* engaging with a circumferential groove portion 11*g* of a shutter member 11 described later. The base supporting portion 220*e* engages with the circumferential groove portion 11*g* during a process in which the gripping portion 210*a* is moved from the initial position to the supplying position, and thus restricts removal of the toner pack 10.

[Mounting Procedure of Supply Container]

Next, using part (a) of FIG. 6, part (b) of FIG. 6, part (a) of FIG. 7, and part (b) of FIG. 7, a toner supplying procedure with use of the toner pack 10 will be described.

Figure 6:
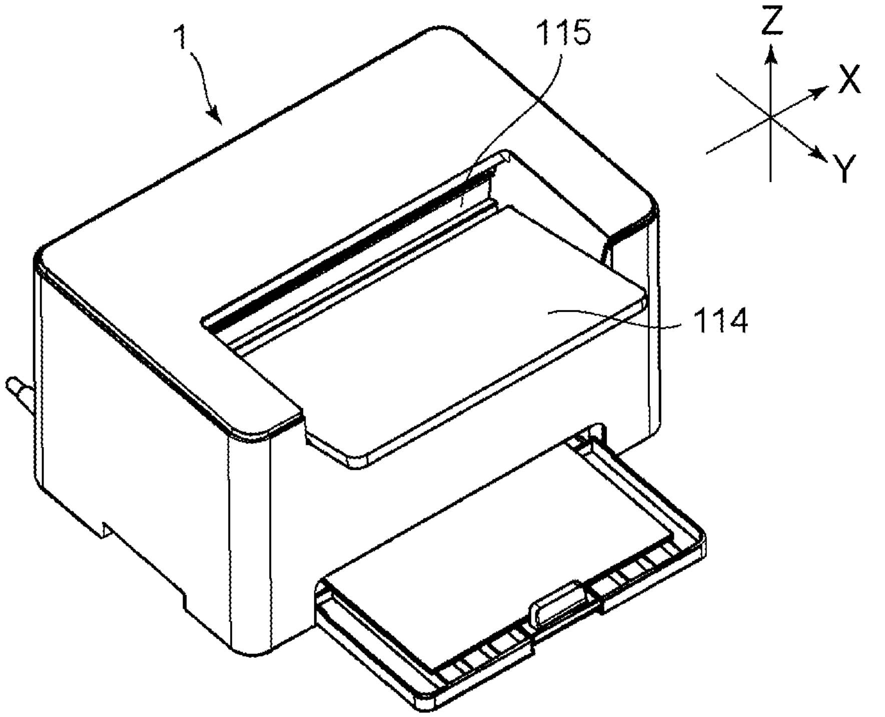
FIG. 6 includes perspective views of the image forming apparatus.
Figure 6:
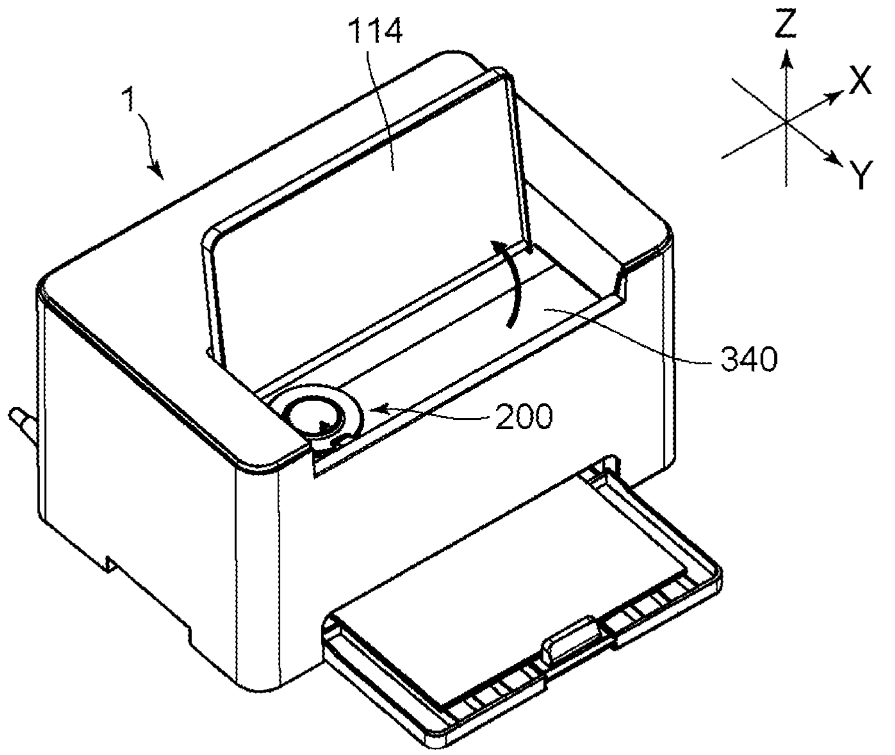

FIG. 6 shows perspective views of the image forming apparatus 1. Part (a) of FIG. 6 is the perspective view of the image forming apparatus 1 in a state in which the discharging tray 114 is closed. Part (b) of FIG. 6 is the perspective view of the image forming apparatus 1 in a state in which the discharging tray 114 is open.

Figure 7:
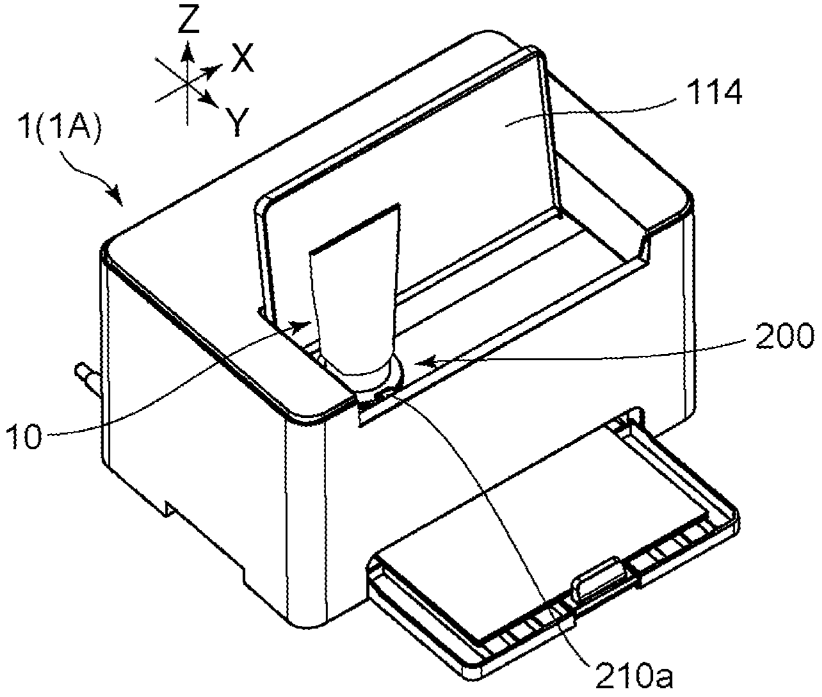
FIG. 7 includes perspective views of the image forming apparatus.
Figure 7:
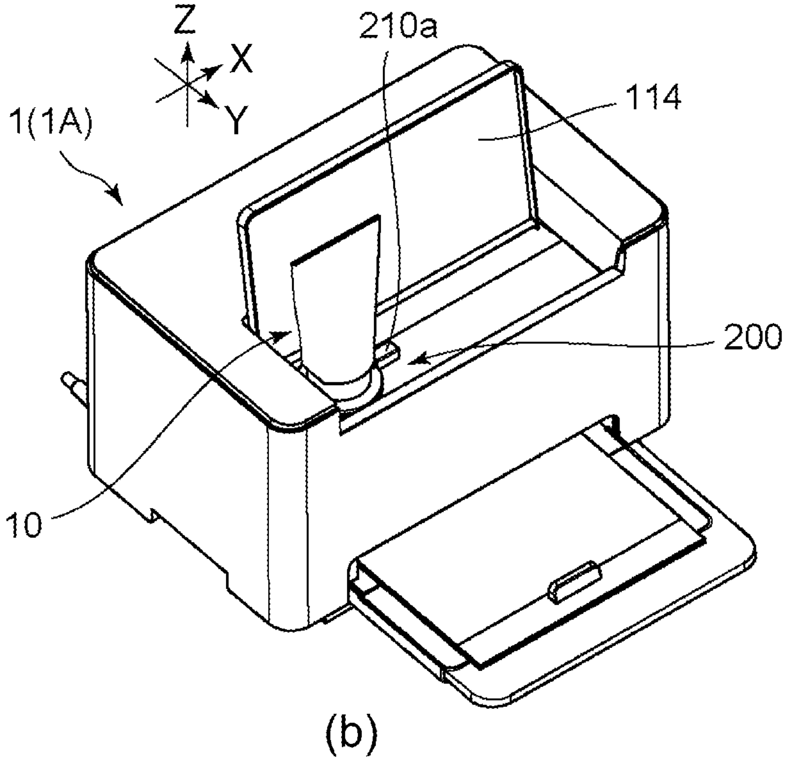

FIG. 7 shows perspective views of the image forming apparatus 1. Part (a) of FIG. 7 is the perspective view of the image forming apparatus 1 in which the gripping portion 210*a* is in the initial position. Part (b) of FIG. 7 is the perspective view of the image forming apparatus 1 in which the toner pack 10 is mounted and the gripping portion 210*a* is in the supplying position.

The supplying portion 200 is provided at the top surface portion 340 of an upper portion of the front surface of a main assembly of the image forming apparatus 1. The discharging tray 114 is configured to be movable between a position where the supplying portion 200 is covered and a position where the supplying portion 220 is exposed.

Specifically, in this embodiment, the discharging tray 114 has a constitution in which the discharging tray 114 covers the supplying portion 200 and is movable between a position where the recording materials P discharged from the discharge opening 115 are capable of being stacked (part (a) of FIG. 6) and a position where the supplying portion 200 is exposed (part (b) of FIG. 6). The supplying portion 200 is provided at the upper portion of the front surface of the main assembly of the image forming apparatus 1, and therefore, the user can easily access the supplying portion 200 also during the supply.

When the toner is to be supplied, the recording materials P stacked on the discharging tray 114 are removed, and the discharging tray 114 is opened and is moved to the position shown in part (b) of FIG. 6. When the discharging tray 114 is opened, the supplying portion 200, the top surface portion 340 provided adjacent to the supplying portion 200, and the mounting portion 210 positioned on the top surface portion 340 are exposed. Then, the toner pack 10 is inserted into the exposed supplying portion 200.

Here, the whole of the image forming apparatus 1 and the toner pack 10 is called an image forming system 1A.

Part (a) of FIG. 7 shows a state in which the toner pack 10 is inserted into the supplying portion 200. Part (b) of FIG. 7 shows a state in which the gripping portion 210*a* is moved from the initial position to the supplying position.

The toner pack 10 is inserted into the supplying portion 200 and the gripping portion 210*a* is moved from the initial position to the supplying position, so that a state in which supply of the toner from the toner pack 10 is formed. In that state, the toner is discharged from the toner pack 10 and is supplied to the accommodating portion 418.

After the toner supply is completed, the gripping portion 210*a* is returned to an original position. At this time, the receiving portion shutter 230 of the supplying portion 200 and the shutter member 11 of the toner pack 10 rotate together. Then, the receiving portion shutter 230 covers the receiving opening 220*c* and the shutter member 11 covers a discharge opening 13*a* of the toner pack 10 (described later). Then, lock between the supplying portion 200 and the toner pack 10 (engagement between the circumferential groove portion 11*g* and the base supporting portion 220*e*) is released (disengaged), so that removal of the toner pack 10 from the supplying portion 200 becomes possible. In other words, in order to demount the toner pack 10 from the image forming apparatus 1, there is a need to cover the discharge opening 13*a* with the shutter member 11.

[Constitution of Toner Pack]

A constitution of the toner pack (toner supply container, toner supply cartridge) 10 will be described.

Figure 8:
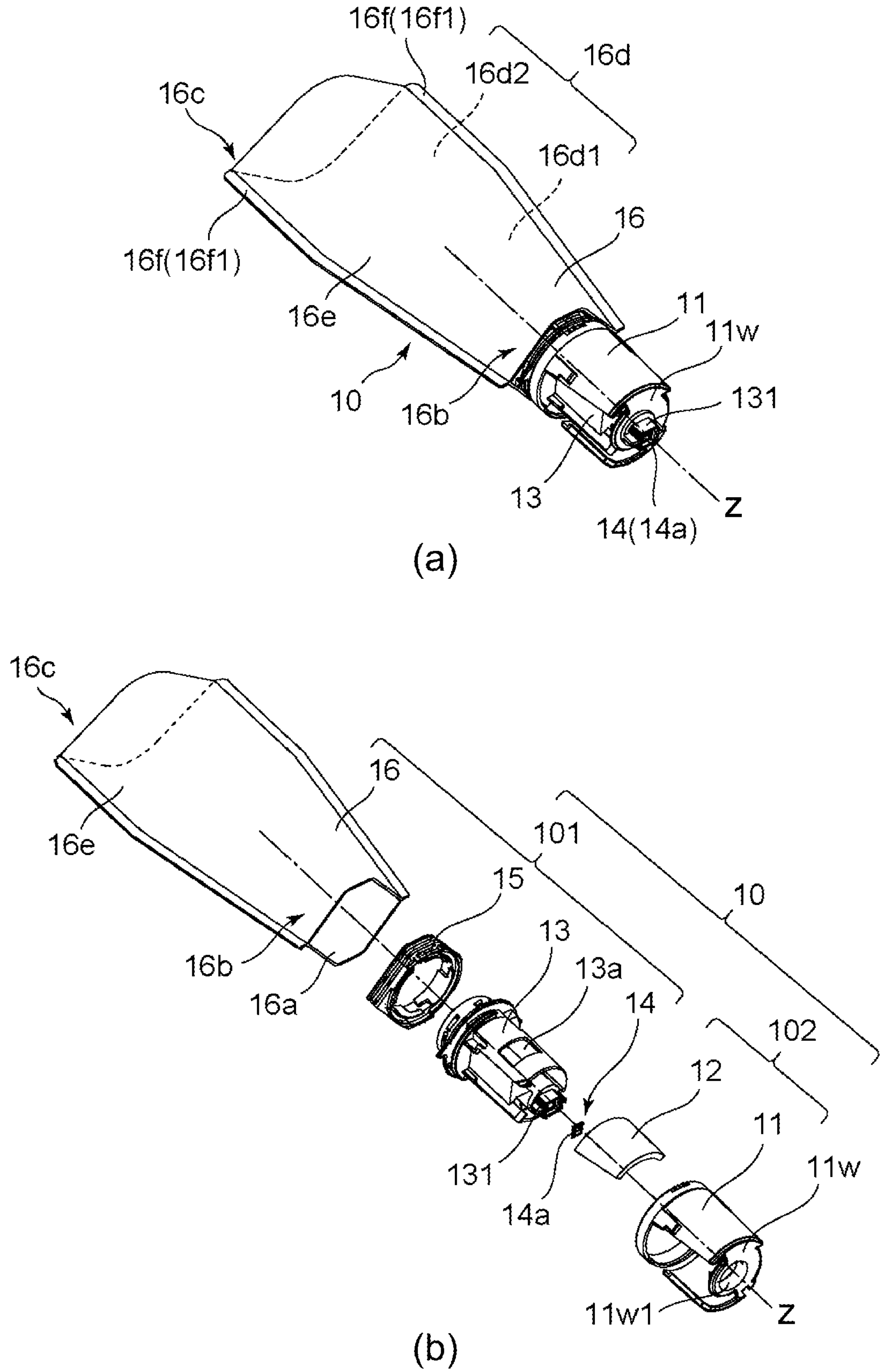
FIG. 8 includes perspective views of a toner pack according to an embodiment 1.

FIG. 8 includes perspective views of the toner pack 10 according to this embodiment. Part (a) of FIG. 8 is the perspective view of the toner pack 10 in an assembled state. Part (b) of FIG. 8 is the perspective view of the toner pack 10 in a disassembled state.

As shown in part (a) of FIG. 8 and part (b) of FIG. 8, the toner pack 10 includes the shutter member 11, a seal member 12, a supply base 13, a memory tag 14, an expansion member 15, and a pouch 16.

In the following, shapes of respective components (parts) and a relationship between the components will be described.

The pouch (bag) 16 as a container portion (container) for accommodating the toner and is a flexible container. Inside the pouch 16, an accommodating portion (space) 16*a* for accommodating the toner is formed.

The pouch 16 includes one end portion (first end portion) 16*b* and the other end portion (second end portion) 16*c* on a side opposite from the one end portion 16*b*. At the one end portion 16*b*, an opening 16*a* for permitting discharge of the toner from the accommodating portion 16*d* is formed. In this embodiment, a first direction is parallel to a direction of a rotational axis z of the shutter member 11 (described later). Further, in this embodiment, a longitudinal direction of the toner pack 10 is a direction parallel to the first direction. That is, a length of the toner pack 10 is longer in length with respect to the first direction than a length thereof with respect to a direction perpendicular to the first direction.

The accommodating portion 16*d* includes a first accommodating portion 16*d*1 and a second accommodating portion 16*d*2 connected to the first accommodating portion 16*d*1. In this embodiment, the first accommodating portion 16*d*1 has a shape narrowing toward the opening portion 16*a* and is formed so that the toner is easy to move toward the opening portion 16*a*.

The pouch 16 can be deformed so as to compress the accommodating portion 16*d* from outside toward an inside of the pouch 16, and by this, discharge of the toner T is promoted. The pouch 16 can be deformed toward the direction perpendicular to the first direction so that opposing walls (part of a sheet portion 16*e* described later) contact each other. For facilitating the toner supply, a force for discharging the toner by deforming the pouch 16 may preferably be small.

In this embodiment, the toner pack 10 assumes the same attitude as an attitude when the toner pack 10 is mounted in the image forming apparatus 1 and is used, and the pouch 16 is deformed as described above in a state in which the toner is capable of being discharged from the discharge opening 13*a* (described later), so that the toner can be discharged. At this time, the pouch 16 may preferably be constituted so that the opposing walls contact each other via the accommodating portion 16*d* when a force of 40N or less acts in a direction perpendicular to the rotational axis z at least at a part of the accommodating portion 16*d*. More preferably, the pouch 16 is constituted so that the opposing walls contact each other via the accommodating portion 16*d* when a force of 10N or less (more preferably 5N or less) acts in the direction perpendicular to the rotational axis z at least at a part of the accommodating portion 16*d*.

In this embodiment, the pouch 16 includes the sheet portion 16*e* for forming the accommodating portion 16*d*. A thickness of the sheet portion 16*e* may preferably be 500 μm or less (more preferably 200 μm or less). In this embodiment, the sheet portion 16*e* is a sheet made of polypropylene having a thickness of 100 μm or less. The pouch 16 is formed in a bag shape by subjecting the sheet portion 16*e* to thermal welding or the like. Incidentally, a form of the pouch 16 is not limited to this, and a material of the sheet portion 16*e* may be polyethylene, polyethylene terephthalate, or the like.

The pouch 16 includes an overlapping portion 16*f* formed by causing parts of the sheet portion 16*e* to overlap with each other. In this embodiment, the overlapping portion 16*f* is formed by subjecting the sheet 16*e* to thermal welding. The overlapping portion 16*f* includes a side (surface) overlapping portion 16*f*1 disposed on a side surface of the pouch 16. The pouch 16 may be formed by folding a single sheet portion 16*e* or may be formed by a plurality of sheets 16*e*.

With respect to a direction perpendicular to the first direction, a size of the other end portion 16*c* of the pouch 16 is larger than a size of a tip (end) portion of a substrate installation portion 131 (described later). When the toner pack 10 is placed on a horizontal surface in an attitude such that the other end portion 16*c* is positioned at a bottom with respect to a vertical direction, the toner pack 10 can stand by itself. At this time, the attitude of the toner pack 10 is an attitude opposite to the attitude of the toner pack 10 when the toner pack 10 is mounted to the image forming apparatus 1. As a result thereof, the memory tag 14 is positioned above the other end portion 16*c*, so that the toner pack 10 can be placed in a state in which the memory tag 14 is spaced from a surface where the toner pack 10 is placed.

The pouch 16 is reinforced by the overlapping portion 16*f*. The side overlapping portion 16*f*1 extends in the first direction. As a result, when the toner pack 10 is placed with the other end portion 16*c* down, the toner pack 10 can be stably placed, and in addition, falling-down of the pouch 16 due to deformation of the toner pack 10 is suppressed.

To the opening 16*a* of the pouch 16, the expansion member (expansion portion, end portion holding portion, annular portion) 15 is mounted. The expansion member 15 is a resin member formed in a substantially hexagonal shape at an outer peripheral surface and is connected to the opening portion 16*a* of the pouch 16. By this, the flexible pouch 16 can maintain a state in which the opening portion 16*a* is open by the expansion member 15. The expansion member 15 has an annular shape such that a hole is formed through which the toner passes. The expansion member 15 is fixed to the supply base 13 so that the opening portion 16*a* and the discharge opening 13*a* communicate with each other as described later.

A connecting method between the expansion member 15 and the pouch 16 may be any method, and for example, it is possible to use a connecting method using various adhesives such as a hot melt, a connecting method in which the pouch 16 is thermally welded to the expansion member 15, and the like. Incidentally, the shape of the outer peripheral surface of the expansion member 15 may preferably be a shape such that the expansion member 15 is liable to slip when the user grips the expansion member 15 and may preferably be a polygonal shape. In this embodiment, a structure of the outer peripheral surface of the expansion member 15 has a substantially hexagonal shape. By this, the opening portion 16*a* of the pouch 16 is also deformed along the outer peripheral surface of the expansion member 15 and is a hexagon in shape.

With respect to the first direction, on an end side of the pouch 16, the supply base (discharging portion, discharging member, toner guiding portion, container receiving portion) 13 is disposed. The supply base 13 has a function as a portion-to-be-inserted (portion-to-be-supported, portion-to-be-mounted) inserted into and supported by the image forming apparatus when the toner pack 10 is mounted to the image forming apparatus 1. In this embodiment, the supply base 13 is mounted to the one end portion of the pouch 16 via the expansion member 15. However, the expansion member 15 and the supply base 13 can also be integrally formed. That is, the supply base 13 is caused to have a function of the expansion member 15, and may be directly connected to the pouch 16.

To the supply base 13, the shutter unit 102 including the shutter member 11 is mounted. The shutter member 11 is a resin component which is formed so as to cover an outer periphery of the supply base 13 and which has a substantially cylindrical shape, and is supported by the supply base 13 in a rotatable state at a predetermined phase. As shown in part (a) of FIG. 8 and part (b) of FIG. 8, a rotational axis of the shutter member 11 relative to the supply base 13 is a rotational axis (first axis) z. The rotational axis z extends in the first direction.

The supply base 13 is provided with the toner discharge opening (discharge opening) 13*a* which is a through hole for permitting discharge of the toner accommodated in the pouch 16 and with the substrate installation portion (projected portion) 131 to which the memory tag 14 is mounted.

Inside the supply base 13, the toner path 13*c* (described later) is formed, which is disposed between the pouch 16 and the discharge opening 13*a* and which is for permitting passing of the toner.

The substrate installation portion 131 is positioned at the top portion of the toner pack 10 with respect to the direction (first direction) parallel to the rotational axis z. In this embodiment, the memory tag 14 is fixed in a position where the memory tag 14 overlaps with the rotational axis z.

The substrate installation portion 131 projects toward a direction of the rotational axis z. On the other hand, the shutter member 11 is provided with a crossing wall 11*w* which extends in a direction crossing the direction of the rotational axis z and which includes a through hole 11*w*1. The through hole 11*w*1 exposes an electroconductive portion 14*a* to outside of the toner pack 10. In this embodiment, the substrate installation portion 131 is inserted into the through hole 11*w*1, so that the electroconductive portion 14*a* is exposed to the outside of the toner pack 10.

The memory tag 14 is fixed to the substrate installation portion 131 with use of a means such as a double-side tape or an adhesive. However, as a method for mounting the memory tag 14 on the substrate installation portion 131, press-fitting or snap-fitting may also be used.

Further, as described later, the memory tag 14 includes the electroconductive portion 14*a* which is an electric contact (see FIG. 11). The electroconductive portion 14*a* of the memory tag 14 is disposed so as to be exposed to outside of the toner pack 10 with respect to a direction parallel to the rotational axis z.

To the shutter member 11, the seal member 12 is mounted. The seal member 12 is positioned in a region between the supply base and the shutter member 11 with respect to a radial direction relative to the rotational axis z, and is applied and fixed to an inner peripheral surface of the shutter member 11 with use of an unshown double-side tape.

The toner pack 10 in this embodiment is capable of promoting discharge of the toner from the toner pack 10 by deforming the pouch 16. For that reason, the pouch 16 may preferably employ a flexible structure (low-rigidity structure). On the other hand, in order to stably mount the toner pack 10 to the image forming apparatus 1, the supply base 13 may preferably employ a structure higher in rigidity than the pouch 16. That is, when a force with the same magnitude acts, deformation of the pouch 16 is larger than deformation of the supply base 13.

When the electroconductive portion 14*a* of the memory tag 14 is positioned by the pouch 16, which is lower in rigidity than the supply base 13, the position of the electroconductive portion 14*a* of the memory tag 14 is liable to be deviated. In this embodiment, the electroconductive portion 14*a* of the memory tag 14 is positioned by the supply base 13, whereby the position of the electroconductive portion 14*a* of the memory tag 14 is not readily deviated. As a result, for example, the electroconductive portion 14*a* of the memory tag 14 can be accurately positioned relative to the image forming apparatus 1.

In the following, the supply base 13, the memory tag 14, the expansion member 15, and the pouch 16 which are integrally connected are referred to as a supply unit 101, and the shutter member 11 and the seal member 12 are referred to as the shutter unit 102. That is, the toner pack 10 includes the supply unit 101 and the shutter unit 102.

In this embodiment, with respect to the first direction, the supply base 13 and the shutter unit 102 are disposed on the one end portion side of the toner pack 10, and the pouch 16 is disposed on the other end portion side of the toner pack 10.

Incidentally, in this embodiment, the shutter unit 102 includes the seal member 12 for sealing between the shutter member 11 and the supply base 13. However, a seal member provided with a hole through which the toner passes, so that the seal member seals between the shutter member 11 and the supply base 13, so that the seal member 12 can be omitted from the shutter unit 102. In this case, the shutter unit 102 does not include the seal member 12.

Further, a portion including the supply base 13, the memory tag 14, and the shutter unit 102 can be called a mounting unit detachably mountable to the image forming apparatus 1. The mounting unit is mountable to the pouch 16. In this embodiment, the pouch 16 and the mounting unit are connected to each other via the expansion member 15.

<Structures and Operations of Shutter Unit and Supply Base>

Structures and operations of the shutter unit (shutter) 102 and the supply base 13 will be described using part (a) of FIG. 9, part (b) of FIG. 9, part (a) of FIG. 10, and part (b) of FIG. 10.

Figure 9:
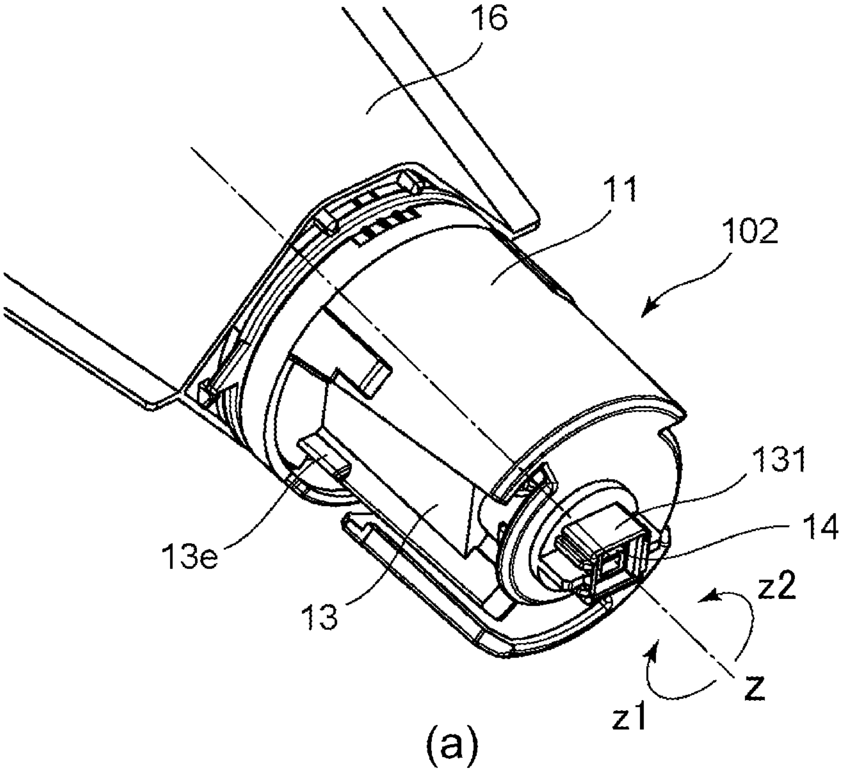
FIG. 9 includes perspective views of the toner pack according to the embodiment 1.
Figure 9:
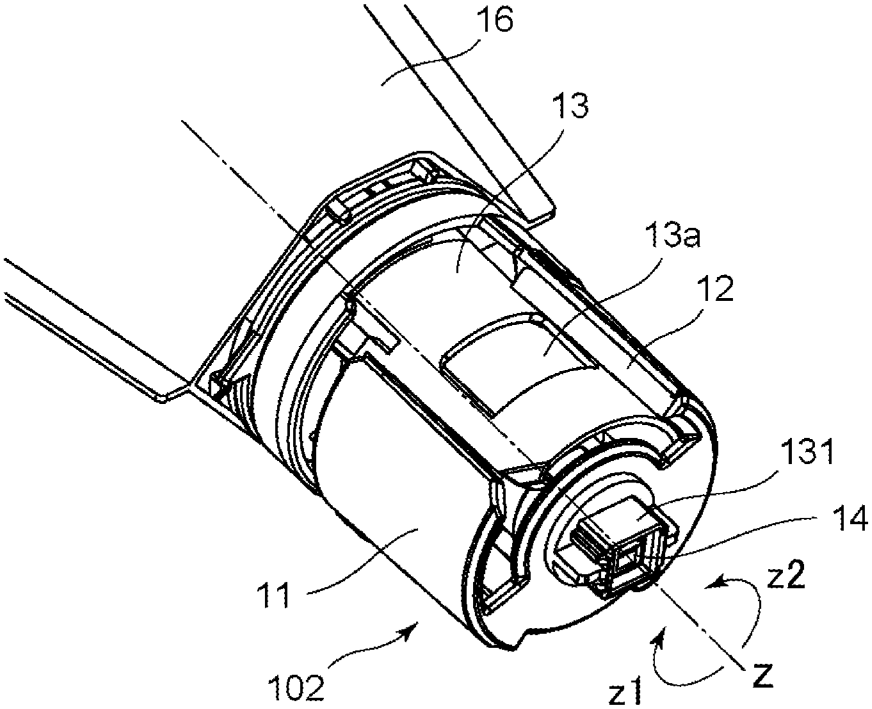
Figure 10:
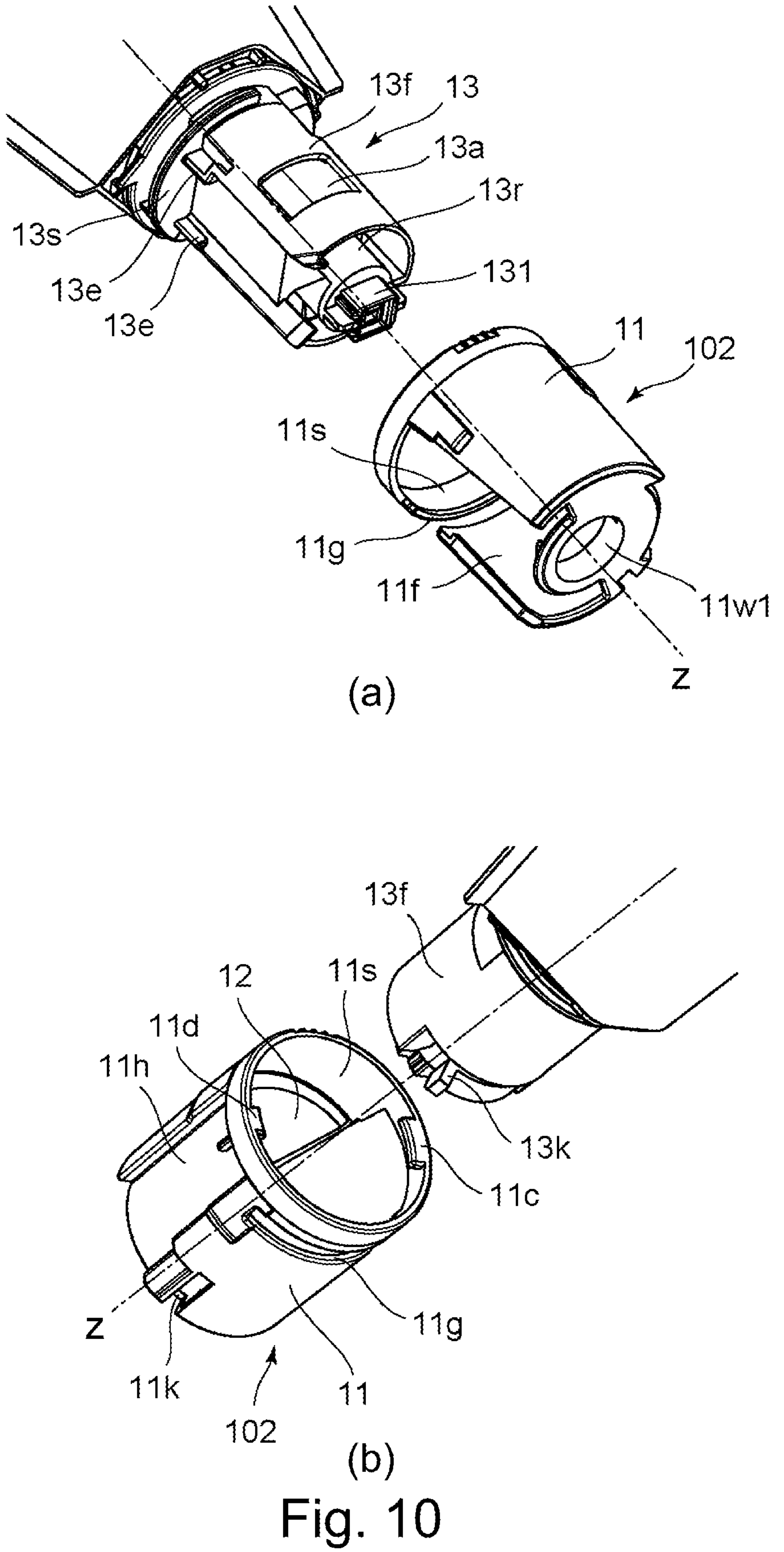
FIG. 10 includes perspective views for illustrating a shutter unit and a supply base according to the embodiment 1.

FIG. 9 includes perspective views of the toner pack 10, in which part (a) of FIG. 9 shows a state in which the shutter unit 102 is in a closed position where the shutter unit 102 seals the discharge opening 13*a*, and part (b) of FIG. 9 shows a state in which the shutter unit 102 is in a retracted position. FIG. 10 (part (a) of FIG. 10, part (b) of FIG. 10) includes perspective views for illustrating the structures of the shutter unit 102 and the supply base 13.

The shutter unit 102 is rotatable around the rotational axis z with the rotational axis z as a center relative to the supply unit 101. That is the rotational axis of the shutter member 11 and the seal member 12 is the rotational axis z.

The shutter unit 102 covers the discharge opening 13*a* and is configured to be movable between a closed position (cover position, first position) where discharge of the toner is restricted and a retracted position (second position, electroconductive portion position) retracted from the closed position. In this embodiment, when the shutter unit 102 is in the second position, the discharge opening 13*a* is exposed toward the outside of the toner pack 10, so that discharge of the toner from the discharge opening 13*a* is permitted. The second position can also be called an open position where the discharge opening 13*a* is opened.

In part (a) of FIG. 9 and part (b) of FIG. 9, z1 direction is a movement direction in which the shutter unit 102 moves from the first position to the second position, and z2 direction is a movement direction in which the shutter unit 102 moves from the second position to the first position.

In this embodiment, a rotation angle (a difference between the first position and the second position) of the shutter unit 102 around the rotation axis z can be made 180 degrees or less. The rotation angle of the shutter unit 102 around the rotation axis z can be made 45 degrees or more. In this embodiment, the rotation angle of the shutter unit 102 is about 90 degrees.

The discharge opening 13*a* opens toward a direction (preferably a direction perpendicular to the first direction) crossing the first direction. In other words, the discharge opening 13*a* is disposed toward the direction (preferably the direction perpendicular to the first direction) crossing the first direction.

Next, a relationship between portions of the shutter unit 102 and the supply base 13 will be described using part (a) of FIG. 10 and part (b) of FIG. 10.

The supply base 13 is provided with the above-described discharge opening 13*a*, the substrate installation portion 131, and in addition, an outer peripheral portion 13*f*, a main assembly-engaging portion 13*e*, a shaft portion 13*r*, a flange portion 13*s*, and a claw portion (shutter restricting portion) 13*k*.

The outer peripheral portion 13*f* (second surface, opening-forming portion, opening-forming wall) 13*f* is provided with the discharge opening 13*a*. The surface of the outer peripheral portion 13*f* faces toward the direction (preferably the direction perpendicular to the first direction) crossing the first direction. That is, a direction normal to the outer peripheral portion 13*f* is the direction (preferably the direction perpendicular to the first direction) crossing the first direction. In this embodiment, the outer peripheral portion 13*f* extends along the direction parallel to the first direction and has an arcuate surface (arcuate shape). That is, a generatrix direction of the arcuate surface is the direction parallel to the first direction. A center of the arcuate surface coincides with the rotational axis z.

The main assembly-engaging portion 13*e* is a projection provided relative to the discharge opening 13*a* with a predetermined gap on a side surface rotated in the Z2 direction by about 90 degrees, and engages with a part of the image forming apparatus 1 when the toner pack 10 is mounted to the image forming apparatus 1.

The shaft portion 13*r* has an arcuate surface (arcuate shape) having a shorter radius than the outer peripheral portion 13*f*. The flange portion 13*s* has an arcuate surface (arcuate shape) having a longer radius than the outer peripheral portion 13*f*. In this embodiment, a center of the arcuate surface of the shaft portion 13*r* and a center of the arcuate surface of the flange portion 13*s* coincide with the rotational axis z. Generatrix directions of these arcuate surfaces are also directions parallel to the first direction.

The claw portion 13*k* has flexibility so as to be movable in a radial direction of a circle with the rotational axis z as a center. A tip (end) portion of the claw portion 13*k* is movable between a position outside the outer peripheral surface 13*f* and a position inside the outer peripheral surface 13*f* in the radial direction of the circle with the rotational axis z as the center.

The shutter member 11 is a resin member having a substantially cylindrical shape. The shutter member 11 is provided with the through hole 11*w*1 and a bearing portion 11*s*. Further, on the shutter member 11, a locking claw 11*c* and a locking claw 11*d*, an exposure portion 11*f*, a circumferential groove portion 11*g*, a locking groove (shutter(-side) portion-to-be-restricted) 11*k*, and an outer periphery recessed portion 11*h* are formed.

The through hole 11*w*1 and the bearing portion 11*s* engage with the shaft portion 13*r* and the flange portion 13*s*, which are provided on the supply base 13. By this, the shutter member 11 and the shutter unit 102 including the seal member 12 become rotatable around the supply base 13 relative to the rotational axis z.

The locking claw 11*c* and the locking claw 11*d* engage with the flange portion 13*s*, and restrict movement of the shutter member 11 in the first direction relative to the supply base 13.

The exposure portion 11*f*, the circumferential groove portion 11*g*, and the outer periphery recessed portion 11*h* are formed at an outer peripheral portion of the shutter member 11. The exposure portion 11*f* has a rectangular shape, and exposes the discharge opening 13 to the outside of the toner pack 10 when the shutter unit 102 is in the second position.

The circumferential groove portion 11*g* is a groove extending in the direction crossing a direction of the rotational axis z. In this embodiment, the circumferential groove portion 11*g* extends toward a circumferential direction (rotational direction of the shutter member 11) of the shutter member 11, and is formed in a part of a region (about 90°) of the shutter member 11. One end of the circumferential groove portion 11*g* is connected to the exposure portion 11*f*.

The outer periphery recessed portion 11*h* is provided on a side opposite from the exposure portion 11*f* with respect to the circumferential direction of the shutter member 11 with the rotational axis z sandwiched therebetween. The outer peripheral recessed portion 11*h* is a surface recessed more toward an inside of the shutter member 11 than the outer periphery of the shutter member 11 with respect to the radial direction of the circle with the rotation axis z as the center.

The locking groove 11*k* is provided in a position where the claw portion 13*k* of the supply base 13 engages with the locking groove 11*k* when the shutter unit 102 is in the first position. The claw portion 13*k* and the locking groove 11*k* engage with each other, so that rotation of the shutter unit 102 is restricted. By this, leakage of the toner due to unintended movement of the shutter unit 102 to the second position by the user is prevented. In the case where the shutter unit 102 is rotated, the shutter unit 102 is displaced in a direction approaching the rotational axis z by applying an external force to the claw portion 13*k*, so that engagement between the claw portion 13*k* and the locking groove 11*k* is released.

The seal member 12 is a sheet-like member which is constituted by a material such as an elastically deformable urethane foam or nonwoven cloth and which has a predetermined thickness. A surface of the seal member 12 on the shutter member 11 side is fixed to the inner peripheral surface of the shutter member 11 by a double-side tape or the like. By this, the seal member 12 is rotatable integrally with the shutter member 11.

Further, the seal member (sealing portion) 12 is pressed to outside and is deformed by the outer peripheral portion 13*f* in a direction approaching the shutter member 11, i.e., a radial direction perpendicular to a direction of the rotational axis z in a state in which the shutter member 11 is assembled with the supply base 13. That is, the seal member 12 is in a state in which the seal member 12 is pressed against the outer peripheral portion 13*f* by a predetermined pressure. By this, the seal member 12 is compressed between the outer peripheral portion 13*f* and the shutter member 11, so that toner leakage from a boundary between the seal member 12 and the outer peripheral portion 13*f* of the supply base 13 can be suppressed.

In this embodiment, the seal member 12 is an opposing portion opposing the discharge opening 13*a* when the shutter unit 102 is in the first position.

Incidentally, a constitution of the opposing portion of the shutter unit 102 is not limited to the above-described constitution. For example, a constitution in which when the shutter unit 102 is in the first position, a part of the shutter member 11 opposes the discharge opening 13*a* may be employed. In that case, the part of the shutter member 11 has a function as the opposing portion.

As shown in part (a) of FIG. 9, when the shutter unit 102 is in the first position, the seal member 12 covers the discharge opening 13*a*. By this, leakage of the toner accommodated in the pouch 16 from the discharge opening 13*a* to outside of the toner pack 10 is prevented. Further, as shown in part (b) of FIG. 9, when the shutter unit 102 is in the second position, the exposure portion 11*f* of the shutter member 11 in a position corresponding to the discharge opening 13*a*. For that reason, the discharge opening 13*a* is exposed to outside of the toner pack 10, so that the toner can be discharged from the discharge opening 13*a* to outside of the toner pack 10.

<Constitution of Memory Unit>

Next, a constitution of the memory unit will be described using FIG. 11. FIG. 11 is an illustration of the memory unit.

Figure 11:
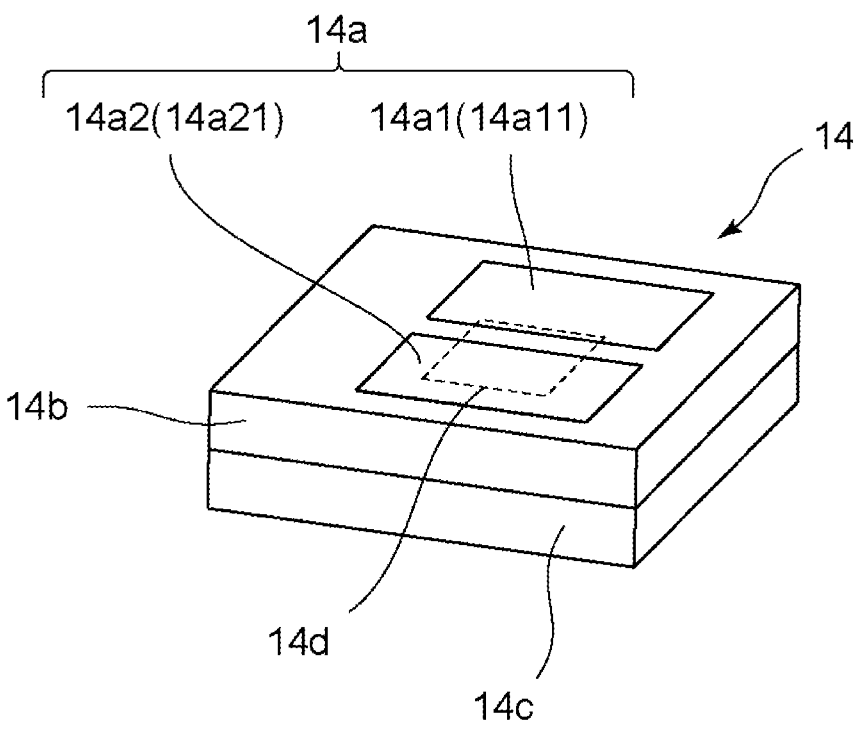
FIG. 11 is an illustration of a memory unit according to the embodiment 1.

As shown in FIG. 11, the memory tag 14 as the memory unit in this embodiment includes a memory (storing element) 14*d* for storing information on the toner pack 10 and an electroconductive portion (electrode portion, interface portion) 14*a* electrically connected to the memory 14*d*, and is constituted as an example of a memory portion. The electroconductive portion 14*a* includes a first electrode (first terminal, first memory electrode) 14*al* and a second electrode (second terminal, second memory electrode) 14*a*2, and the first electrode 14*al* and the second electrode 14*a*2 are electrically connected to the memory 14*d*.

The memory tag 14 is provided with a holding portion (holding substrate) 14*b* for holding the electroconductive portions 14*a* (first electrode 14*al*, second electrode 14*a*2). The memory tag 14 is provided with a protective portion 14*c* for protecting the memory 14*d* by covering the memory 14*d*. In this embodiment, the electroconductive portion 14*a* is disposed on one surface (front surface) of the holding portion 14*b*, and the memory 14*d* is disposed on the other surface (back surface) of the holding portion 14*b*.

The first electrode 14*al* has a first exposed surface 14*a*11 exposed to the outside of the toner pack 10. The second electrode 14*a*2 has a second exposed surface 14*a*21 exposed to the outside of the toner pack 10.

The memory tag 14 in this embodiment is a plate-like member of 5.5 mm×5 mm in area and 1.4 mm in thickness.

The holding portion 14*b* and the protective portion 14*c* are integrated with each other. The memory tag 14 has a two-layer structure formed by the holding portion 14*b* and the protective portion 14*c*. The holding portion 14*b* and the protective portion 14*c* can be said as being a part of a substrate portion (substrate) provided with the electroconductive portion 14*a*.

In the memory 14*d*, information on the toner pack is stored. In the information on the toner pack 10, information on a lot of the toner pack 10 and information on an amount and a characteristic of the toner accommodated in the toner pack 10 are included.

In the memory 14*d*, information on the image forming apparatus 1 to which the toner pack 10 is mounted is stored in some cases. In the information on the image forming apparatus 1, information used for control of the image forming apparatus 1 by a controller 399 is included. The controller 399 for the image forming apparatus 1 is electrically connected to the memory 14*d* through the electroconductive portion 14*a*, so that the controller 399 reads the information stored in the memory 14*d* and controls the image forming apparatus 1.

In this embodiment, the number of electrodes disposed in the electroconductive portion 14*a* is two, but the present invention is not limited thereto. For example, the electroconductive portion 14*a* may include three or more electrodes. Further, one electrode is disposed in the holding portion, and another electrode may be disposed in another portion.

<Arrangement of Memory Unit>

Arrangement of the memory unit will be described using part (a) of FIG. 12, part (b) of FIG. 12, part (a) of FIG. 13, part (b) of FIG. 13, part (a) of FIG. 14, and part (b) of FIG. 14.

Figure 12:
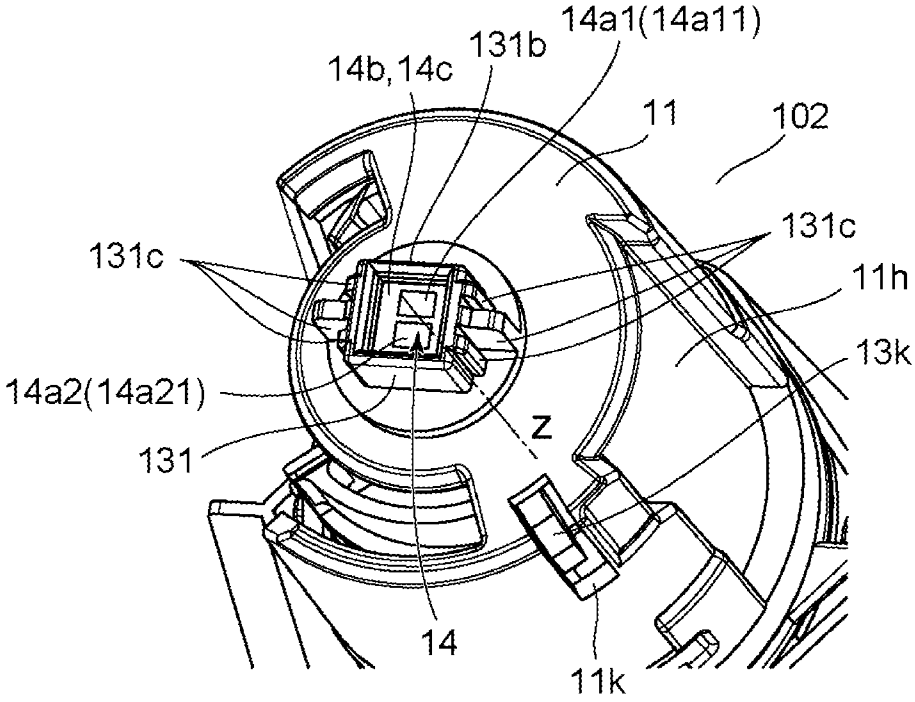
FIG. 12 includes a perspective views of an end portion (tip portion) of the toner pack according to the embodiment 1.
Figure 12:
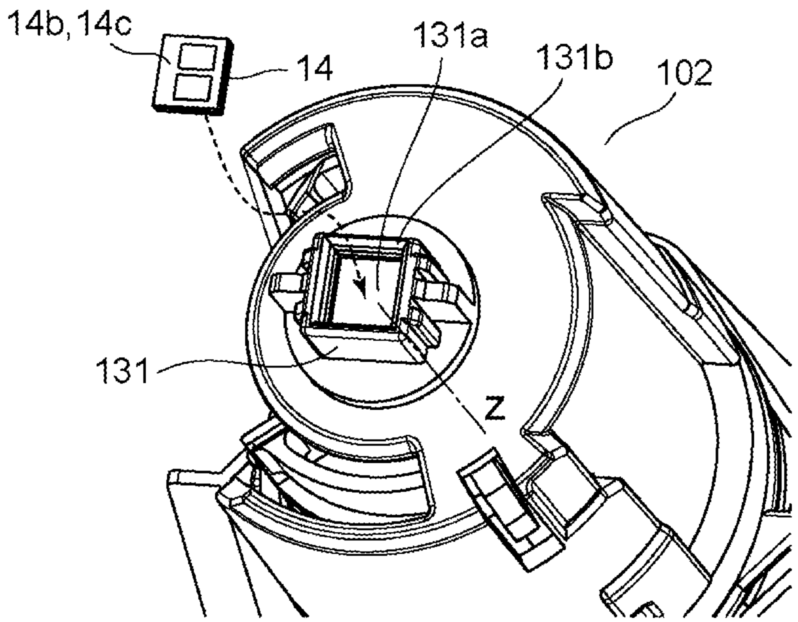

FIG. 12 includes perspective views showing a tip (end) portion of the toner pack 10. Part (a) of FIG. 12 is the perspective view of the tip portion of the toner pack 10 with which the memory tag 14 is assembled. Part (b) of FIG. 12 is the perspective view of the tip portion of the toner pack 10 before the memory tag 14 is assembled with the toner pack 10. FIG. 13 includes perspective views for illustrating the arrangement of the memory unit in this embodiment. Part (a) of FIG. 13 is a bottom view of the toner pack 10. Part (b) of FIG. 13 is in an enlarged view of the memory tag 14. FIG. 14 includes views for illustrating the arrangement of the memory unit in this embodiment. Part (a) of FIG. 14 is a side view of the toner pack 10. Part (b) of FIG. 14 is a sectional view of the toner pack 10.

As shown in part (a) of FIG. 12, the substrate installation portion 131 is provided at a tip of the toner pack 10 in a direction of the rotational axis z. Further, as shown in part (b) of FIG. 12, the substrate installation portion 131 is provided with an installation surface (installation portion, positioning surface, positioning portion) 131*a* on which the memory tag 14 is adhesively fixed.

In this embodiment, the installation surface 131*a* positions the electroconductive portions 14*a* (first electrode 14*a*1, second electrode 14*a*2) via a substrate including the protective portion 14*c* and the holding portion 14*b*. That is, the substrate of the memory tag 14 is fixed on the installation surface 131*a* and is positioned by the installation surface 131*a*, whereby the electroconductive portion 14*a* is positioned relative to the supply base 13. In this embodiment, the installation surface 131*a* positions the electroconductive portion 14*a* with respect to the first direction and a direction perpendicular to the first direction.

In a state in which the memory tag 14 is positioned by the installation surface 131*a*, the first exposed surface 14*a*11 of the first electrode 14*al* is disposed along a direction (preferably a direction perpendicular to) crossing the first direction. In other words, in the state in which the memory tag 14 is positioned, the first exposed surface 14*a*11 of the first electrode 14*al* is disposed on a flat plane (imaginary flat plane) extending along the direction (preferably the direction perpendicular to) crossing the first direction.

In this state, the first exposed surface 14*a*11 faces the first direction. That is, a normal direction to the first exposed surface 14*a*11 crosses (preferably be perpendicular to) the direction perpendicular to the first direction. The first exposed surface 14*a*11 is exposed to outside of the toner pack 10. In this embodiment, with respect to the first direction, on a back surface of the first exposed surface 14*a*11, the supply base 13 and the pouch 16 are disposed. Further, the first exposed surface 14*a*11 extends in the direction (preferably the direction perpendicular to) crossing the first direction, while the outer peripheral portion 13*f* of the supply base 13 extends in the direction crossing (preferably be perpendicular to) a direction in which the first exposed surface 14*a*11 extends.

Similarly, in a state in which the memory tag 14 is positioned by the installation surface 131*a*, the second exposed surface 14*a*21 of the second electrode 14*a*2 is disposed along a direction (preferably a direction perpendicular to) crossing the first direction. In other words, in the state in which the memory tag 14 is positioned, the second exposed surface 14*a*21 of the second electrode 14*a*2 is disposed on a flat plane (imaginary flat plane) extending along the direction (preferably the direction perpendicular to) crossing the first direction.

In this state, the second exposed surface 14*a*21 faces the first direction. That is, a normal direction to the second exposed surface 14*a*21 crosses (preferably be perpendicular to) the direction perpendicular to the first direction. The second exposed surface 14*a*21 is exposed to the outside of the toner pack 10. In this embodiment, with respect to the first direction, on a back surface of the second exposed surface 14*a*21, the supply base 13 and the pouch 16 are disposed. The outer peripheral portion 13*f* of the supply base 13 extends in the direction crossing (preferably be perpendicular to) a direction in which the second exposed surface 14*a*21 extends.

In this embodiment, the second exposed surface 14*a*21 and the first exposed surface 14*a*11 are disposed on the same flat plane. However, with respect to the first direction, a position of the second exposed surface 14*a*21 and a position of the first exposed surface 14*a*11 may be different from each other.

Here, around the memory tag 14, with respect to the first direction, a most tip end portion 131*b* as a projected portion projecting more than the first exposed surface 14*a*11 and the second exposed surface 14*a*21 is provided. The installation surface 131*a* is positioned inside the most tip end portion 131*b* of the substrate installation portion 131 with respect to the first direction.

As regards the most tip end portion 131*b*, with respect to the first direction, a distance from the most tip end portion 131*b* to the installation surface 131*a* is longer than 1.4 mm, which is a thickness (equal to a thickness of the substrate) of the memory tag 14. By this, when the memory tag 14 is fixed on the installation surface 131*a*, a relationship such that the most tip end portion 131*b* of the substrate installation portion 131 projects toward the tip side more than the electroconductive portion 14*a* with respect to the first direction is formed. Accordingly, it is possible to prevent damage of the electroconductive portion 14*a* generated by contact of the electroconductive portion 14*a* by a user not being careful or contact of an article with the electroconductive portion 14*a* during handling by the user.

Further, the substrate installation portion 131 includes a projected wall 131*c* extending in a direction crossing the first direction. In this embodiment, a plurality of projected walls 131*c* are provided with the memory tag 14 sandwiched therebetween. The projected wall 131*c* has a function as a connector positioning portion (apparatus-side contact point positioning portion) which engages with a connector 250 described later and which is for positioning the connector 250.

Figure 13:
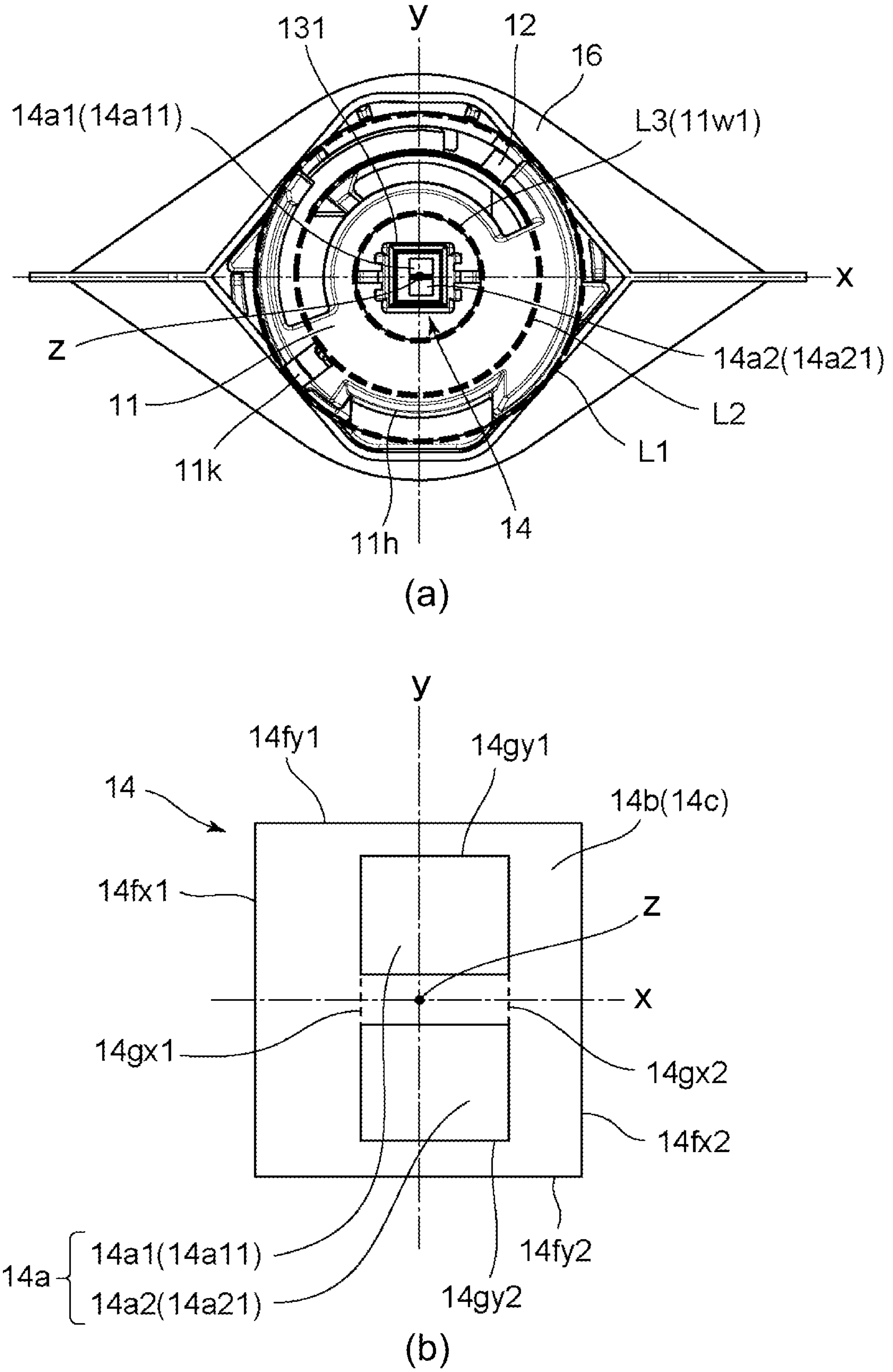
FIG. 13 includes views for illustrating arrangement of a memory unit according to the embodiment 1.

Part (a) of FIG. 13 is a view in which the toner pack 10 is viewed along the direction (first direction) of the rotational axis z.

In this embodiment, as viewed along the first direction, the first exposed surface 14*a*11 and the second exposed surface 14*a*21 are disposed inside a first imaginary circle L1 passing through an outer end (outermost portion) of the shutter unit 102 with the rotational axis z as the center. Here, the outer end of the shutter unit 102 refers to a portion most away from the rotational axis z with respect to the direction perpendicular to the rotational axis z. In this embodiment, the outer end of the shutter unit 102 coincides with an outer end (portion most away from the rotational axis z) of the shutter member 11. As viewed along the first direction, the whole of the shutter unit 102 is positioned inside the imaginary circle L1.

As viewed along the first direction, the first electroconductive portion surface 14*a*11 and the second exposed surface 14*a*21 are positioned inside a second imaginary circle L2 passing through an opposing portion opposing the discharge opening 13*a* with the rotational axis z as the center. As described above, in this embodiment, the opposing portion is a surface (surface contacting a periphery (outer peripheral portion) of the discharge opening 13*a*) opposing the discharge opening 13*a* of surfaces of the seal member 12.

Further, as viewed along the first direction, the first exposed surface 14*a*11 and the second exposed surface 12*a*21 are disposed inside a third imaginary circle L3 passing through an inner end (innermost portion) of the shutter unit 102 with the rotational axis z as the center. Here, the inner end of the shutter unit 102 refers to a portion closest to the rotational axis z with respect to the direction perpendicular to the rotational axis z. In this embodiment, the inner end of the shutter unit 102 coincides with an inner wall surface of the through hole 11*w*1 of the shutter member 11. That it, the inner end of the shutter unit 102 coincides with an inner end (portion closest to the rotational axis z) of the shutter member 11. As viewed along the first direction, the whole of the shutter unit 102 is positioned outside the imaginary circle L3.

According to a constitution of this embodiment, the first exposed surface 14*a*11 and the second exposed surface 14*a*21 can be disposed in a space-saving manner.

In this embodiment, the electroconductive portion 14*a* is disposed inside the first imaginary circle L1, the second imaginary circle L2, and the second imaginary circle L3. Further, the holding portion 14*b* is disposed inside the first imaginary circle L1, the second imaginary circle L2, and the second imaginary circle L3. Further, the whole of the memory tag 14 including the memory 14*d* is disposed inside the first imaginary circle L1, the second imaginary circle L2, and the second imaginary circle L3.

Part (b) of FIG. 13 is an enlarged view in the neighborhood of the memory tag 14. As viewed along the first direction, the rotational axis z is positioned between the first exposed surface 14*a*11 and the second exposed surface 14*a*21.

As viewed along the first direction, with respect to a first perpendicular direction x perpendicular to the first direction, the holding portion 14*b* of the memory tag 14 includes a first substrate end 14*fx*1 and a second substrate end 14*fx*2 opposite from the first substrate end 14*fx*1. As viewed along the first direction, with respect to a second perpendicular direction y perpendicular to the first direction and the first perpendicular direction x, the holding portion 14*b* of the memory tag 14 includes a third substrate end 14*fy*1 and a fourth substrate end 14*fy*2 opposite from the third substrate end 14*fy*1.

With respect to the first perpendicular direction x, the rotational axis z is positioned between the first substrate end 14*fx*1 and the second substrate end 14*x*2. With respect to the first perpendicular direction x, the whole of the electroconductive portion 14*a* is positioned between the first substrate end 14*fx*1 and the second substrate end 14*fx*2. With respect to the second perpendicular direction y, the rotational axis z is positioned between the third substrate end 14*fy* 1 and the fourth substrate end 14*fy*2. With respect to the second perpendicular direction y, the whole of the electroconductive portion 14*a* is positioned between the third substrate end 14*fy*1 and the fourth substrate end 14*fy*2. Incidentally, as viewed along the first direction, with respect to the first perpendicular direction x, an outer configuration of the holding portion 14*b* coincides with an outer configuration of the protecting portion 14*a*.

As viewed along the first direction, with respect to the first perpendicular direction x, the electroconductive portion 14*a* of the memory tag 14 includes a first electroconductive portion end 14*gx*1 and a second electroconductive portion end 14*gx*2 opposite from the first electroconductive portion end 14*gx*1. As viewed along the first direction, with respect to the second perpendicular direction y, the electroconductive portion 14*a* of the memory tag 14 includes a third electroconductive portion end 14*gy* 1 and a fourth electroconductive portion end 14*gy*2 opposite from the third electroconductive portion end 14*gy*1. The first electroconductive portion end 14*gx*1, the second electroconductive portion end 14*gx*2, the third electroconductive portion end 14*gy*1, and the fourth electroconductive portion end 14*gy*2 coincide with at least either one of end portions of the first exposed surface 14*a*11 and the second exposed surface 14*a*21.

With respect to the first perpendicular direction x, the rotational axis z is positioned between the first electroconductive portion end 14*gx*1 and the second electroconductive portion end 14*gx*2. With respect to the first perpendicular direction x, the whole of the electroconductive portion 14*a* is positioned between the first electroconductive portion end 14*gx*1 and the second electroconductive portion end 14*gx*2. With respect to the second perpendicular direction y, the rotational axis z is positioned between the third electroconductive portion end 14*gy* 1 and the fourth electroconductive portion end 14*gy*2. With respect to the second perpendicular direction y, the whole of the electroconductive portion 14*a* is positioned between the third electroconductive portion end 14*gy*1 and the fourth electroconductive portion end 14*gy*2.

With respect to the direction perpendicular to the first direction, the holding portion 14*b* and the electroconductive portion 14*a* of the memory tag 14 are disposed in the neighborhood of the rotational axis z of the shutter unit 102.

Accordingly, the holding portion 14*b* and the electroconductive portion 14*a* of the memory tag 14 and the shutter unit 102 can be disposed in a space-saving manner.

The shutter unit 102 is constituted so that the electroconductive portion 14*a* is exposed to outside of the toner pack 10. In this embodiment, the electroconductive portion 14*a* of the memory tag 14 is disposed at a portion close to the rotational axis z of the shutter unit 102, so that a degree of design freedom regarding the shape and the arrangement of the shutter unit 102 can be improved.

Figure 14:
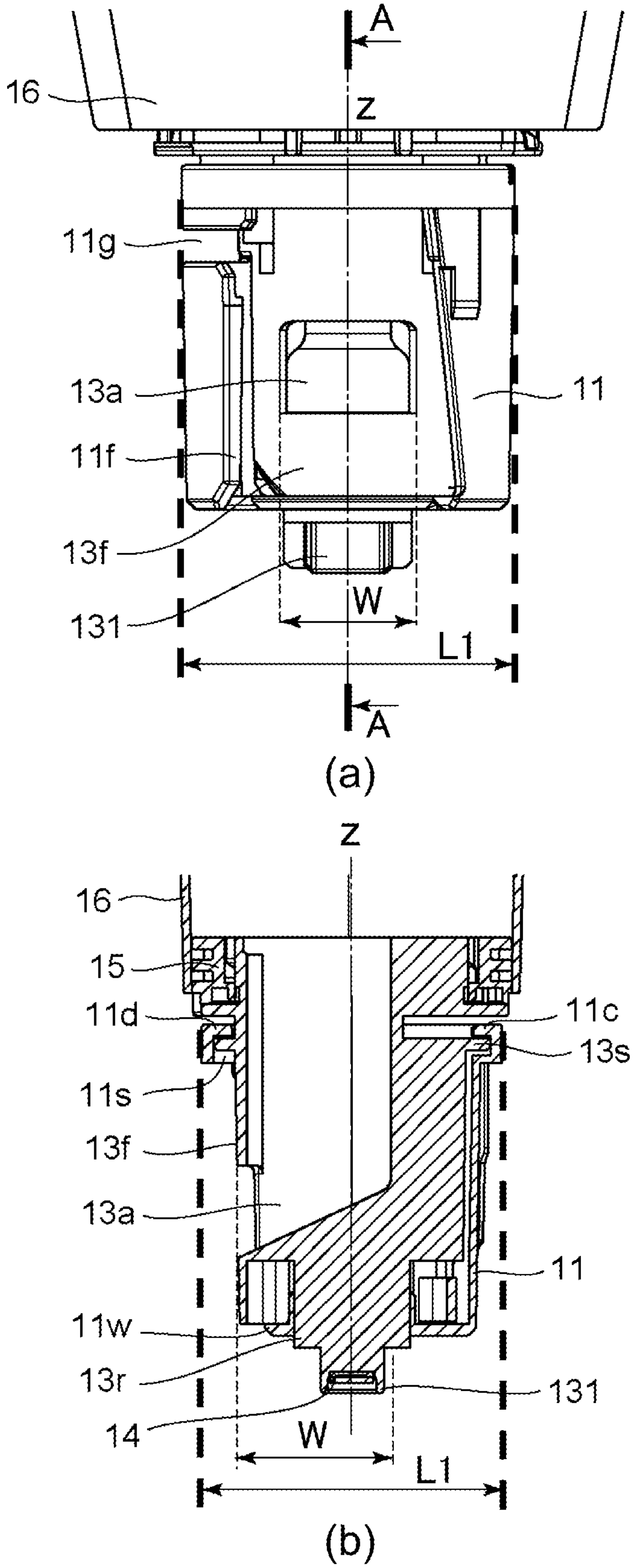
FIG. 14 includes view for illustrating the arrangement of the memory unit according to the embodiment 1.

Part (a) of FIG. 14 is a side view of the toner pack 10 in which the toner pack 10 is viewed from above toward below in part (a) of FIG. 13. Part (b) of FIG. 14 is a sectional view of the toner pack 10 in a line A-A along the rotational axis z of part (a) of FIG. 14.

A fixing position of the memory tag 14 is in inside of a radius of rotation (radius of the imaginary circle L1) of the shutter member 11 projected in the first direction, illustrated by thick broken lines in FIG. 13. The radius of rotation of the shutter member 11 coincides with a radius of rotation of the shutter unit 102. The fixing position of the memory tag 14 is disposed inside for a projection range W of the discharge opening 13*a* in the first direction as shown by thin broken lines in parts (a) and (b) of FIG. 14.

[Constitution of Supplying Portion]

Next, the constitution of the supplying portion 200 will be described using FIG. 15 and FIG. 16.

Figure 15:
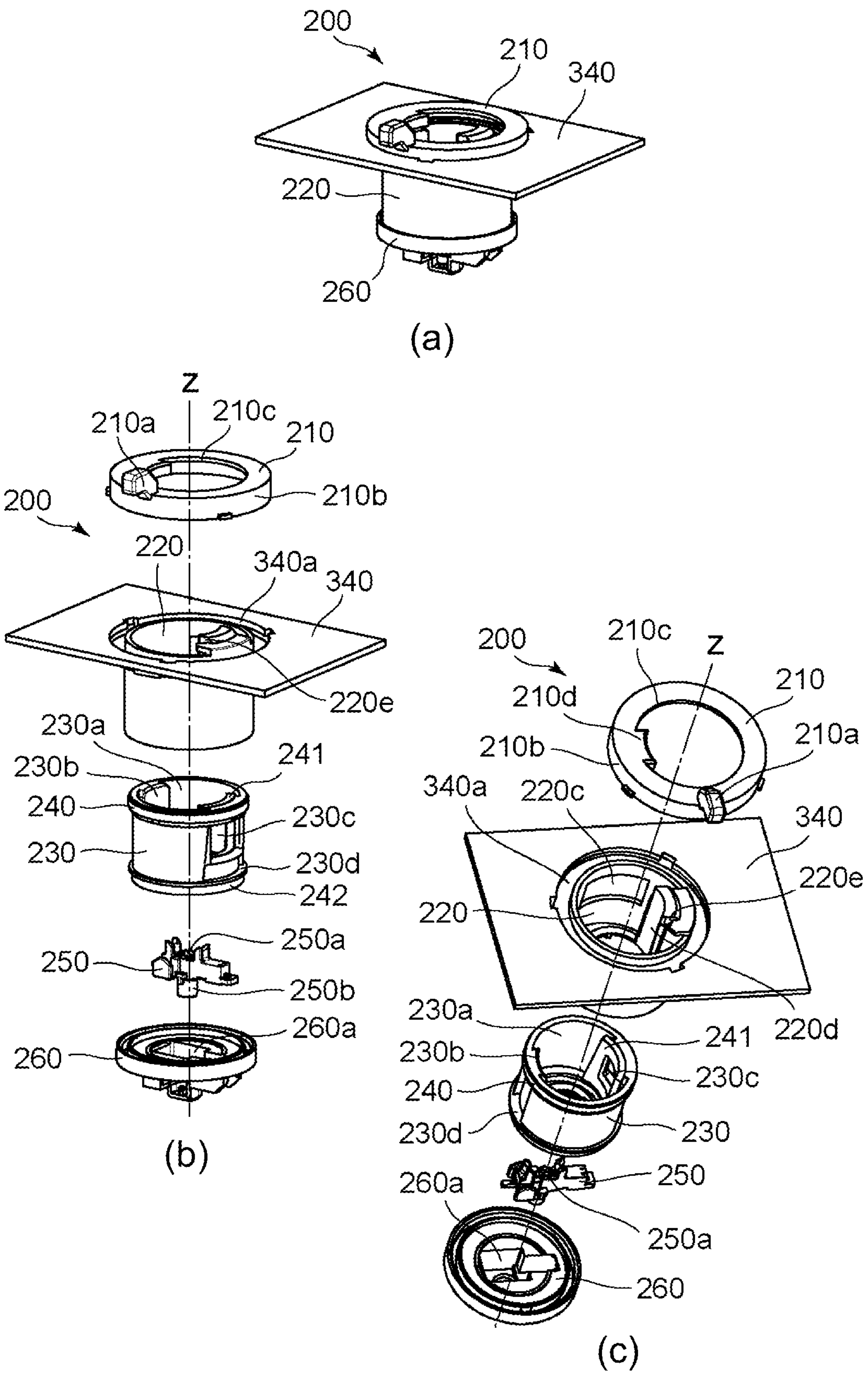
FIG. 15 includes views for illustrating a structure of the supplying portion according to the embodiment 1.

FIG. 15 includes views for illustrating the constitution of the supplying portion 200. Part (a) of FIG. 15 is a partial perspective view of the supplying portion 200, and part (b) of FIG. 15 and part (c) of FIG. 15 are exploded perspective views in which the supplying portion 200 is viewed from directions different from each other. FIG. 16 includes views for illustrating the constitution of the supplying portion 200. Part (a) of FIG. 16 is a schematic view in which the supplying portion 200 is viewed from directly above the rotational axis z, part (b) of FIG. 16 is a sectional view along A-A direction shown in part (a) of FIG. 16, and part (c) of FIG. 16 is an exploded view of the supplying portion 200 in a cross section as viewed from a direction of part (b) of FIG. 16.

The supplying portion 200 is disposed on the top surface portion 340 and is provided with the mounting portion 210, the toner receiving portion 220, a receiving portion shutter 230, a shutter seal 240, a receiving seal 241, the connector 250, a receiving bottom 260, and a bottom seal 242.

Figure 16:
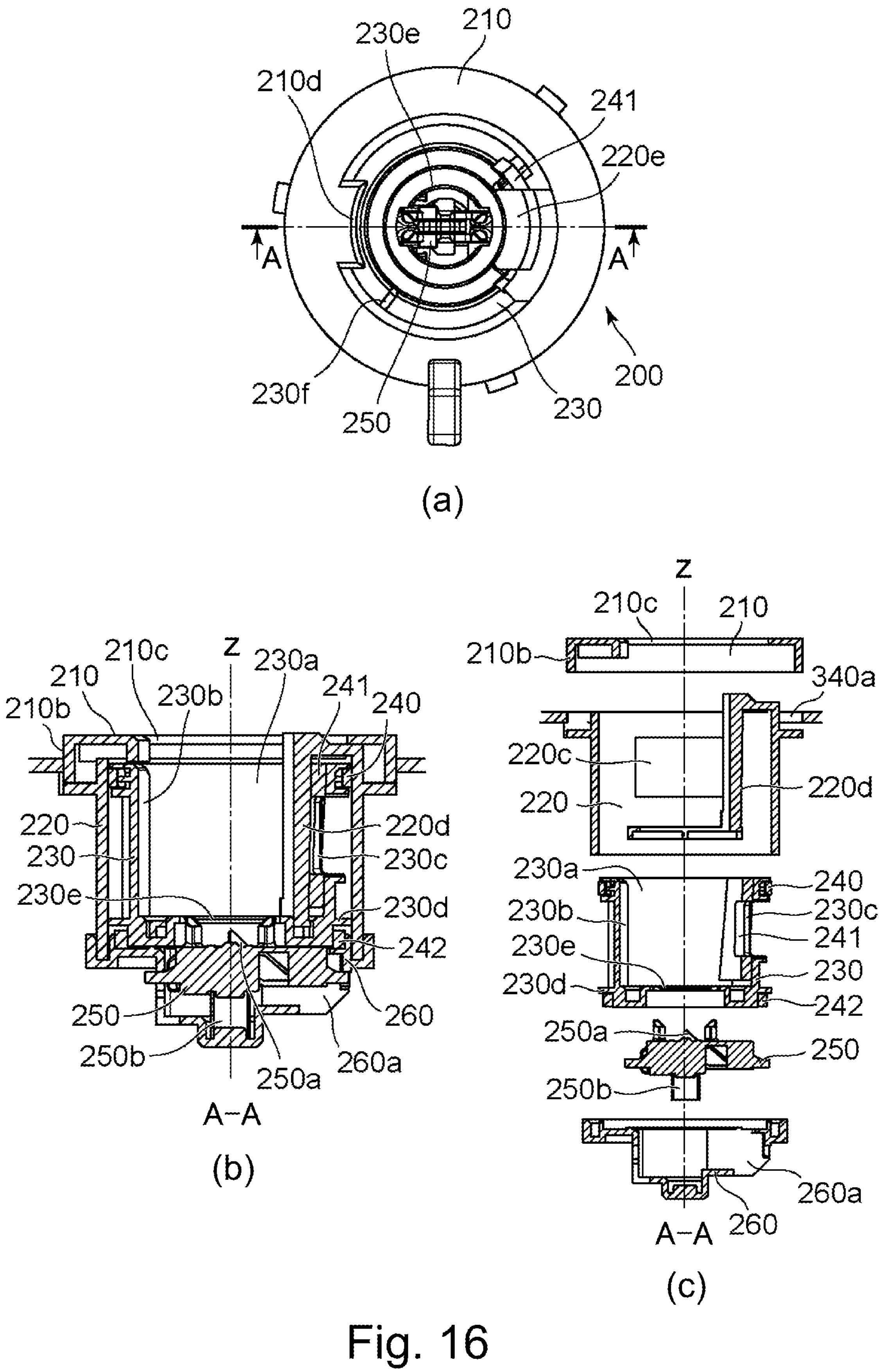
FIG. 16 includes views for illustrating the structure of the supplying portion according to the embodiment 1.

The rotational axes shown in parts (a) to (c) of FIG. 15 and parts (a) to (c) of FIG. 16 are rotational axes of the receiving portion shutter 230 and the mounting portion 210 and coincide with the rotational axis z of the above-described shutter unit 102 in the state in which the toner pack 10 is mounted.

The mounting portion 210 includes a gripping portion 210*a* operated by the user, a ring portion 210*b* engaging with the top surface portion 340, a mounting hole 210*c* in which the toner pack 10 is mounted, and an engaging projection 210*d* engaging with the shutter member 11.

The top surface portion 340 is a part of the casing 72 and includes a guiding groove 340*a*.

The toner receiving portion 220 includes a receiving opening 220*c*, a seal inner wall 220*d*, and a base supporting portion 220*e*.

The receiving portion shutter 230 is a cylindrical component (part) and includes an inner peripheral portion 230*a*, a shutter engaging portion 230*b*, a shutter opening 230*c*, a flange portion 230*d*, a connecting hole 230*e*, and a claw releasing portion (restriction releasing portion) 230*f*. Further, to the receiving portion shutter 230, each of a shutter seal 240, a receiving seal 241, and a bottom seal 242 which are formed with a foam material such as a urethane foam is applied and fixed by a double-side tape.

The connector 250 includes a connector electrode 250*a* contacting the electroconductive portion 14*a* of the memory tag 14, and an urging spring 250*b*. The connector electrode 250*a* and the urging spring 250*b* are springs made of metal and have flexibility with respect to a direction along the rotational axis z. Further, the connector electrode 250*a* is electrically connected to the controller 399 of the image forming apparatus 1 by an unshown signal line. The connector 250 is a holding member for holding the connector electrode 250*a*.

The receiving bottom 260 includes a connector accommodating portion 260*a* and is fixed to the toner receiving portion 220.

Here, the mounting portion 210 is rotatable around the rotational axis z relative to the top surface portion 340 by being supported at the ring portion 210*b* by the guiding groove 340*a* provided in the top surface portion 340.

Further, the receiving portion shutter 230 is rotatable around the rotational axis z relative to the toner receiving portion 220 by being supported at the flange portion 230*d* by the toner receiving portion 220.

The shutter seal 240 is provided at an outer periphery of the receiving portion shutter 230 and contacts the toner receiving portion 220, so that the shutter seal 240 closes a gap between the receiving portion shutter 230 and the toner receiving portion 220. The receiving seal 241 is provided so as to surround a periphery of the shutter opening 230*c* at the inner peripheral portion 230*a* of the receiving portion shutter 230 and contacts the seal inner wall 220*d* of the toner receiving portion 220. The bottom seal 242 is provided at a lower portion of the flange portion 230*d* and closes a gap between the receiving portion shutter 230 and the receiving bottom 260.

Further, on a bottom side of the receiving portion shutter 230, the connecting hole 230*e* penetrating through the receiving portion shutter 230, and through the connecting hole 230*e*, the connector electrode 250*a* of the connector 250 is exposed toward above in the first direction. Further, at this time, the connector 250 is in a state in which the connector 250 is supported by the receiving bottom 260, and the urging spring 250*b* is in a compressed state. Accordingly, by a force of the urging spring 250*b*, the connector 250 is urged upward in the direction of the rotational axis z. The connector 250 engages with the projected wall 131*d* of the supply base 131, and is positioned with respect to the direction perpendicular to the first direction. That is, the projected wall 131 has a function as an electrode positioning portion for positioning the connector electrode 250*a*.

[Supply of Toner from Toner Pack]

Next, a supplying operation of the toner from the toner pack 10 toward the image forming apparatus 1 will be described using FIG. 17 to FIG. 21.

Figure 17:
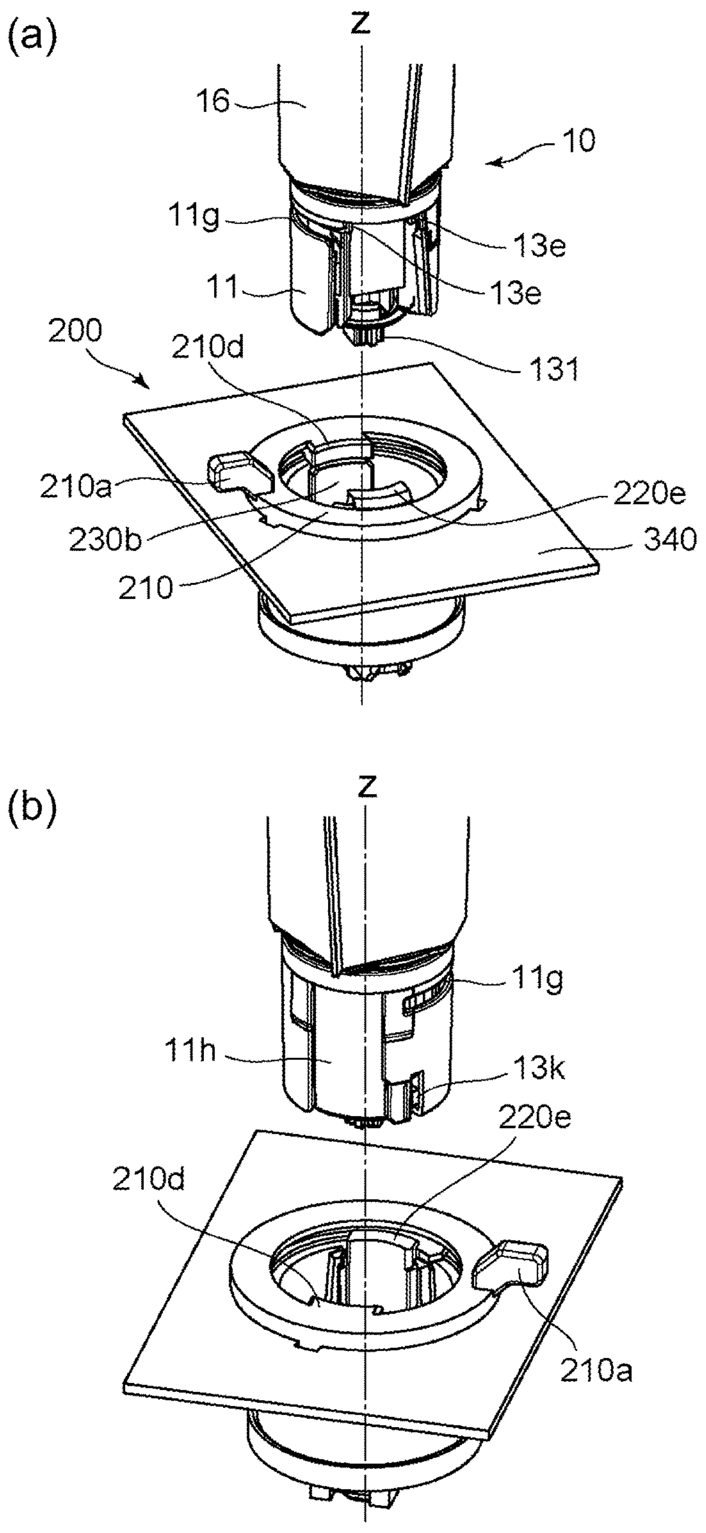
FIG. 17 includes views for illustrating mounting of the toner pack according to the embodiment 1.

FIG. 17 (part (a) of FIG. 17, part (b) of FIG. 17) includes perspective views for illustrating mounting of the toner pack 10. Part (a) of FIG. 17 and part (b) of FIG. 17 are the perspective views in which states before the toner pack 10 is inserted into the supplying portion 200 are viewed from different directions.

The toner pack 10 is mounted into the supplying portion 200 so that the supply base 13 is positioned on a side downstream of the pouch 16 with respect to a mounting direction thereof into the supplying portion 200. That is, in this embodiment, the toner pack 10 is mounted so that the electroconductive portion 14*a* faces the downstream side in the mounting direction. Accordingly, the first exposed surface 14*a*11 and the second exposed surface 14*a*21 are disposed so as to face the downstream side of the mounting direction and is exposed toward the downstream side of the mounting direction.

In this embodiment, the toner pack 10 is mounted to the supplying portion 200 along the rotational axis z. Further, in this embodiment, the toner pack 100 is mounted so that the direction of the rotational axis z becomes parallel to the vertical direction.

When the toner pack 10 is mounted to the supplying portion 200, the main assembly(-side) engaging portion 13*e* of the supply base 13 and the base supporting portion 220*e* of the toner receiving portion 220 engage with each other. By this, relative to the image forming apparatus 1, rotation of the supply base 13, the expansion member 15, and the pouch 16 around the rotational axis z is restricted. Further, at the same time, the outer peripheral recessed portion 11*h* of the shutter member 11 engages with each of the engaging projection 210*d* of the mounting portion 210 and the shutter engaging portion 230*b* of the receiving portion shutter 230.

In the receiving portion shutter 230, the claw releasing portion 230*f* shown in part (a) of FIG. 16 is provided in a position corresponding to the claw portion 13*k*. Accordingly, when the toner pack 10 is inserted into the supplying portion 200, the claw releasing portion 230*f* retracts the claw portion 13*k* toward the inside of the shutter member 11. By this, engagement between the claw portion 13*k* and the locking groove 11*k* is avoided, so that the shutter member 11 and the supply base 13 becomes rotatable relative to each other.

By the above, the rotation of the supply unit 101 around the rotational axis z is restricted, and also the shutter unit 102 is rotatable integrally with the mounting portion 210 and the receiving portion shutter 230. That is, when the toner pack 10 is mounted to the supplying portion 200, the toner receiving portion 220, the supply base 13, the expansion member 15, and the pouch 16 become a state in which these members are fixed to each other (state in which these members are not moved relative to each other). In this state, when the mounting portion 210 is rotated, the shutter unit 102 and the receiving portion shutter 230 are rotated around the rotational axis z relative to the toner receiving portion 220, the supply base 13, the expansion member 15, and the pouch 16.

Figure 18:
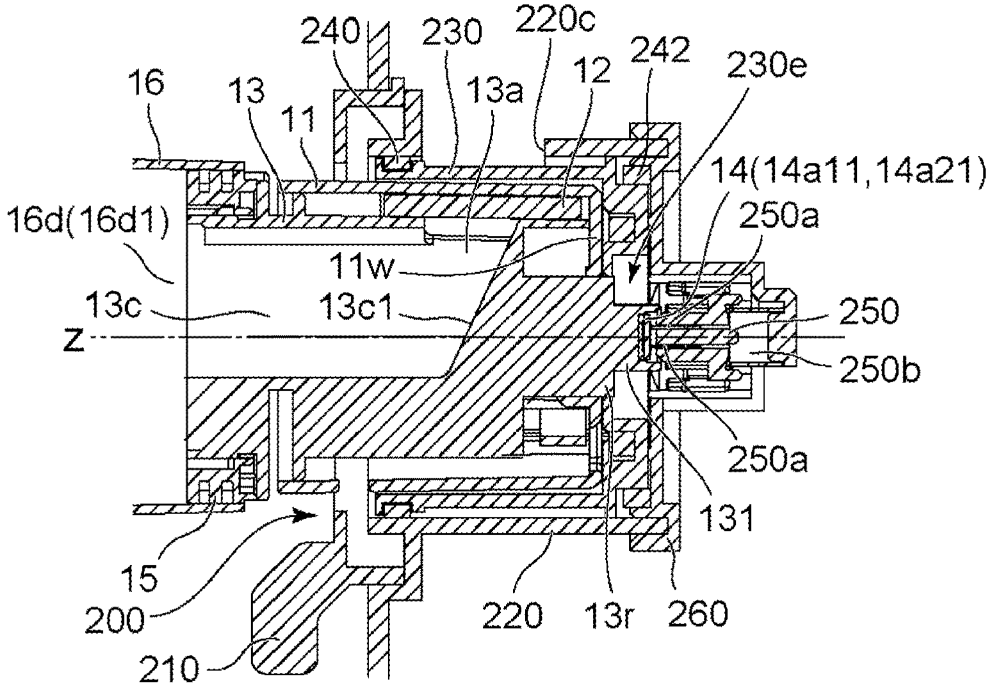
FIG. 18 includes illustrations of the supplying portion to which the toner pack according to the embodiment 1 is mounted.
Figure 18:
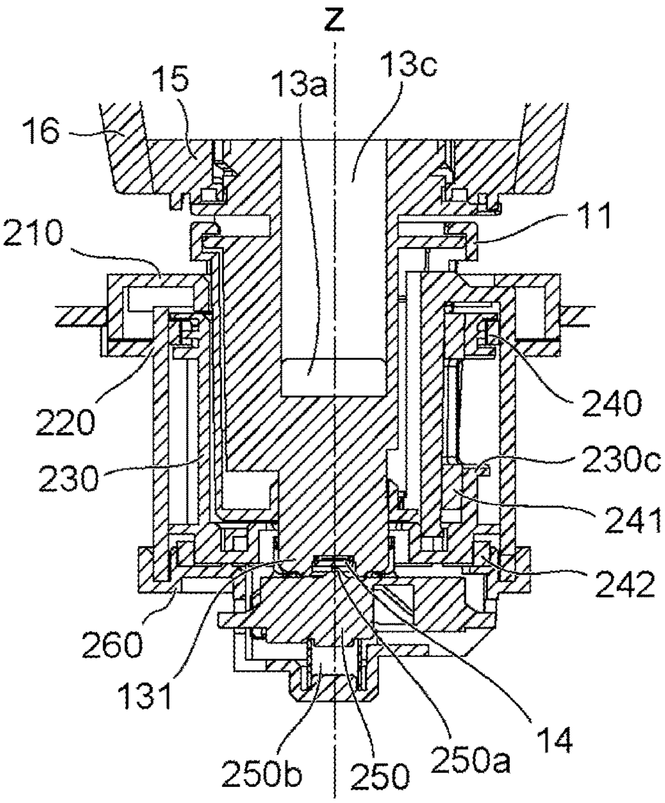

FIG. 18 includes illustrations of the supplying portion 200 to which the toner pack 10 is mounted. Part (a) of FIG. 18 is a sectional view passing through the rotational axis z and a center of the discharge opening 13*a*. Part (b) of FIG. 18 is a sectional view passing through the rotational axis z and perpendicular to part (a) of FIG. 18.

As shown in part (a) of FIG. 18, by engagement between the shaft portion 13*r* of the supply base 13 and the connecting hole 230*e* of the receiving portion shutter 230, the rotational axis z of the shutter unit 102 and the rotational axis z of the receiving portion shutter 230 coincide with each other. That is, the connecting hole 230*e* is a positioning portion for determining the position of the toner pack 10 relative to the image forming apparatus 1 with respect to the direction perpendicular to the direction of the rotational axis z. The shaft portion 13*r* is a portion-to-be-positioned which is positioned by the connecting hole 230*e*. In this embodiment, in a state in which the supply base 13 is fixed to the image forming apparatus 1, the shutter unit 102 moves around the supply base 13.

In this embodiment, the installation surface 131*a* is disposed at the tip portion of the shaft portion 13*r*. In other words, the electroconductive portion 14*a* of the memory tag 14 is disposed at the tip portion of the shaft portion 13*r*.

The supply base 13 is provided with the toner path 13*c* connected at one end thereof to the discharge opening 13*a*. In this embodiment, the other end of the toner path 13*c* is connected to the accommodating portion 16*d* (first accommodating portion 16*d*1) of the toner pack 16. Inside the toner path 13*c*, the toner supplied from the accommodating portion 16*d* (first accommodating portion 16*d*1) of the toner pack 16 passes toward the discharge opening 13*a*. The toner path 13*c* has a toner guiding surface (guiding surface) 13*cl* inclined relative to the direction of the rotational axis z and opposing the discharge opening 13*a*. The toner supplied from the toner pack 16 to the toner path 13*c* is easy to move toward the discharge opening 13*a* by the toner guiding surface 13*c*1. With respect to the rotational axis z, a position of the toner guiding surface 13*cl* overlaps with the position of the discharge opening 13*a*.

As viewed along the first direction, the electroconductive portion 14*a* (first electrode 14*a*1, second electrode 14*a*2) overlaps with the toner path 13*c* and the toner guiding surface 13*cl*. More specifically, the first exposed surface 14*a*11 and the second exposed surface 14*a*21 overlap with the toner path 13*c* and the toner guiding surface 13*c*1. That is, the electroconductive portion 14*a* can be disposed in a space-saving manner while ensuring sizes of the toner path 13*c* and the toner guiding surface 13*c*1.

Further, in this embodiment, with respect to the first direction, a position of the toner path 13*c* and a position of the electroconductive portion 14*a* do not overlap with each other. That is, with respect to the first direction, the toner path 13*c* and the electroconductive portion 14*a* are disposed in different positions (deviated positions). Accordingly, with respect to the direction perpendicular to the first direction, it is possible to suppress upsizing of the supply base 13 while ensuring an arrangement space of the toner path 13*c* and an arrangement space of the electroconductive portion 14*a*.

In this embodiment, the discharge opening 13*a* is disposed inside the shutter unit 102, and the first exposed surface 14*a*11 and the second exposed surface 14*a*21 are disposed outside the shutter unit 102. Accordingly, it is possible to suppress deposition of the toner on the first exposed surface 14*a*11 and the second exposed surface 14*a*21.

Further, the crossing wall 11*w* of the shutter member 11 is positioned between the discharge opening 13*a* and the first exposed surface 14*a*11 with respect to the direction of the rotational axis z (first direction). The crossing wall 11*w* of the shutter member 11 is positioned between the discharge opening 13*a* and the second exposed surface 14*a*21 with respect to the direction of the rotational axis z. In this embodiment, the crossing wall 11*w* is positioned between the electroconductive portion 14*a* of the memory tag 14 including the first exposed surface 14*a*11 and the second exposed surface 14*a*21, and the discharge opening 13*a*.

Further, in part (a) of FIG. 18, the shutter unit 102 is in the first position, and the seal member 12 covers the discharge opening 13*a*. At this time, the crossing wall 11*w* partitions between the electroconductive portion 14*a* of the memory tag 14 including the first exposed surface 14*a*11 and the second exposed surface 14*a*21, and the discharge opening 13*a*.

Accordingly, it is possible to suppress deposition of the toner on the electroconductive portion 14*a* of the memory tag 14 including the first exposed surface 14*a*11 and the second exposed surface 14*a*21.

Further, as shown in part (a) of FIG. 18 and part (b) of FIG. 18, the memory tag 14 fixed to the top portion of the toner pack 10 contacts the connector 250. The connector 250 engages with the above-described projected wall 131*c*. By this, with respect to the direction crossing (preferably perpendicular to) the first direction, the connector 250 is positioned relative to the toner pack 10.

Further, with mounting of the toner pack 10, the electroconductive portion 14*a* presses the connector electrode 250*a* in the direction along the rotational axis z. By this, the connector electrode 250*a* contacts the electroconductive portion 14*a* at a predetermined pressure so that the storing element of the memory tag 14 and the controller 399 of the image forming apparatus 1 are electrically connected to each other. More specifically, one connector electrode 250*a* contacts the first exposed surface 14*a*11, and the other connector electrode 250*a* contacts the second exposed surface 14*a*21.

Figure 19:
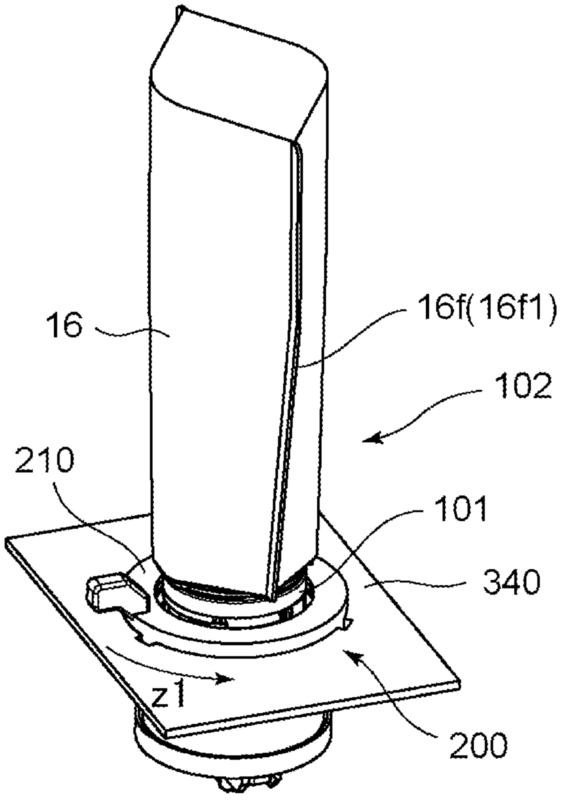
FIG. 19 includes illustrations of the supplying portion to which the toner pack according to the embodiment 1 is mounted.
Figure 19:
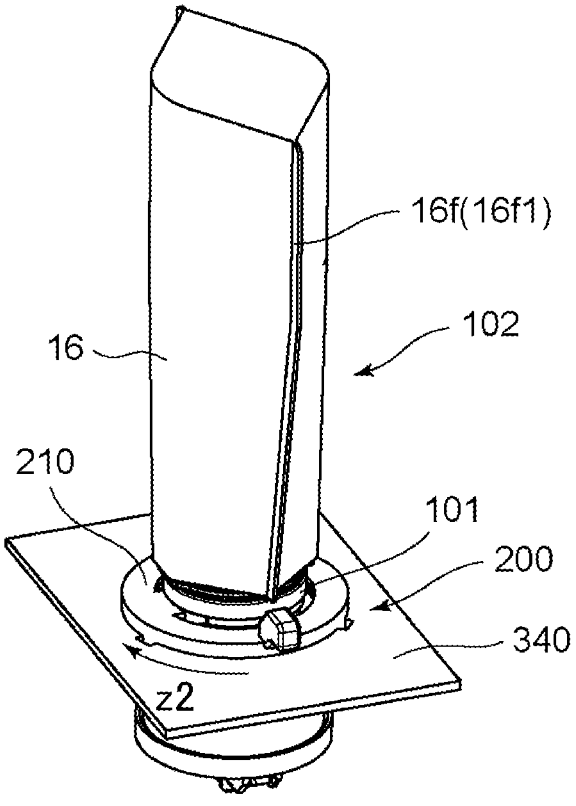

FIG. 19 includes illustrations of the supply portion 200 to which the toner pack 10 is mounted. Part (a) of FIG. 19 is the illustration before the mounting portion 210 is rotated. Part (b) of FIG. 19 is the illustration after the mounting portion 210 is rotated.

Discharge of the toner from the toner pack 10 toward the image forming apparatus 1 will be described. In order to perform the toner discharge, the user rotates the mounting portion 210 by about 90 degrees from a state in which the toner pack 10 is mounted to the supply portion 200 as shown in part (a) of FIG. 19, in z1 direction relative to the rotational axis z as shown in part (b) of FIG. 19.

As regards the toner pack 10, a length of the toner pack 10 with respect to the vertical direction in an attitude of the toner pack 10 mounted to the supply portion 200 (attitude during the use, attitude during the supply) is longer than a length of the toner pack 10 with respect to the horizontal direction. As described above, when the toner pack 10 is mounted to the supply portion 200, the mounting portion 210, the shutter unit 102, and the receiving portion shutter 230 are in an integrally rotatable state. Accordingly, by rotation of the mounting portion 210, the shutter unit 102 and the receiving portion shutter 230 are rotated integrally with the mounting portion 210. At this time, the pouch 16, the expansion member 15, and the supply base 13 are not moved (rotated) relative to the image forming apparatus 1. Further, when the shutter unit 102 and the receiving portion shutter 230 are rotated with the mounting portion 210, the toner receiving portion 220 is not moved (rotated).

Figure 20:
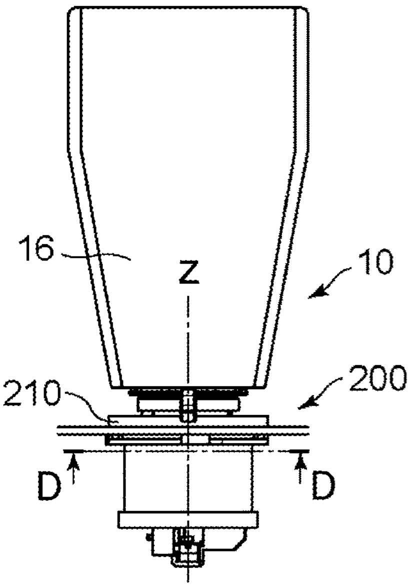
FIG. 20 includes illustrations of an operation of the shutter unit according to the embodiment 1 and a receiving portion shutter.
Figure 20:
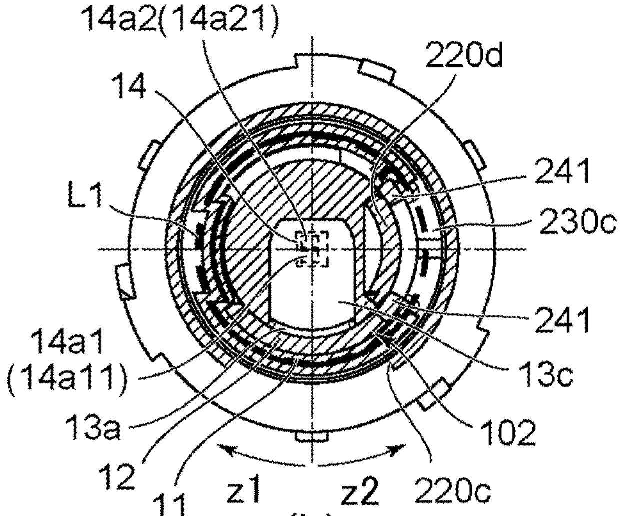
Figure 20:
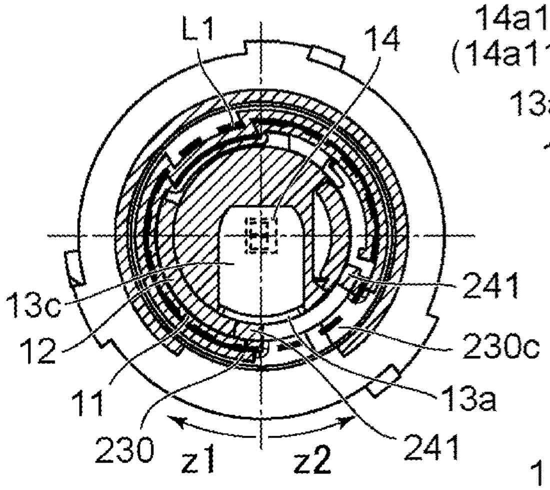
Figure 20:
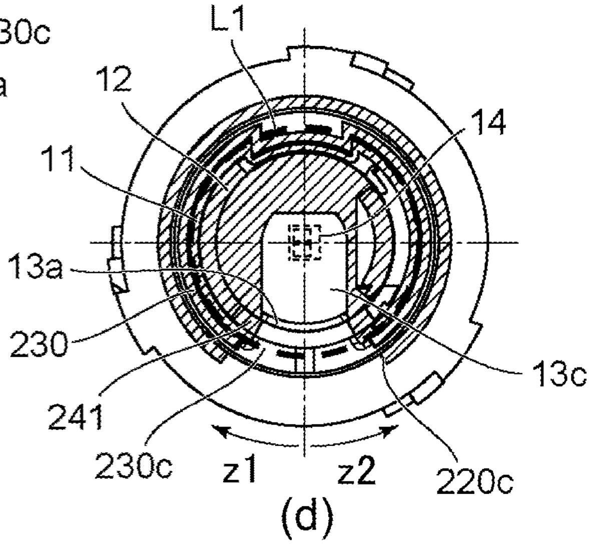

Here, in FIG. 20, a state in which the toner discharge is enabled by rotating the shutter unit 102 and the receiving portion shutter 230 is shown stepwise.

FIG. 20 includes illustrations of operations of the shutter unit 102 and the receiving portion shutter 230. Part (a) of FIG. 20 is the illustration in which the toner pack 10 mounted to the supply portion 200 is viewed from a side opposite from the discharge opening 13*a* along the direction perpendicular to the first direction. Parts (b) to (d) of FIG. 20 are sectional views in which a cut surface of the toner pack 10 and the supply portion 200 along a chain line D-D shown in part (a) of FIG. 20 is viewed from the tip (end) side of the toner pack 10. Further, in parts (b) to (d) of FIG. 20, an outer configuration of the memory tag 14 and the electroconductive portion 14*a* is projected by a broken line.

Part (b) of FIG. 20 is a state immediately after the toner pack 10 is mounted to the supply portion 200, and at this time, the discharge opening 13*a* is closed by the seal member 12 compressed by the shutter member 11. Further, the shutter opening 230*c* of the receiving portion shutter 230 is closed by the seal inner wall 220*d* and the receiving seal 241. When the user rotates the mounting portion 210, as shown in part (c) of FIG. 20, the shutter member 11, the seal member 12, the receiving portion shutter 230, and the receiving seal 241 are also integrally rotated. When the user further rotates the mounting portion 210, as shown in part (d) of FIG. 20, the discharge opening 13*a* of the toner pack 10, the shutter opening 230*c* of the receiving portion shutter 230, the shutter opening 230*c* of the receiving portion shutter 230, and the receiving opening 220*c* of the toner receiving portion 220 are in a communication state. Accordingly, the toner accommodated inside the pouch 16 can be discharged from the receiving opening to the accommodating portion 418 positioned inside the image forming apparatus 1.

As described above, as shown by thick broken lines in parts (b) to (d) of FIG. 20, it becomes possible to dispose the memory tag 14 within a range of the imaginary circle L1 of the shutter member 11.

Next, retention of the toner pack 10 relative to the toner pack 10 with the rotation of the shutter unit 102 will be described using FIG. 21.

Figure 21:
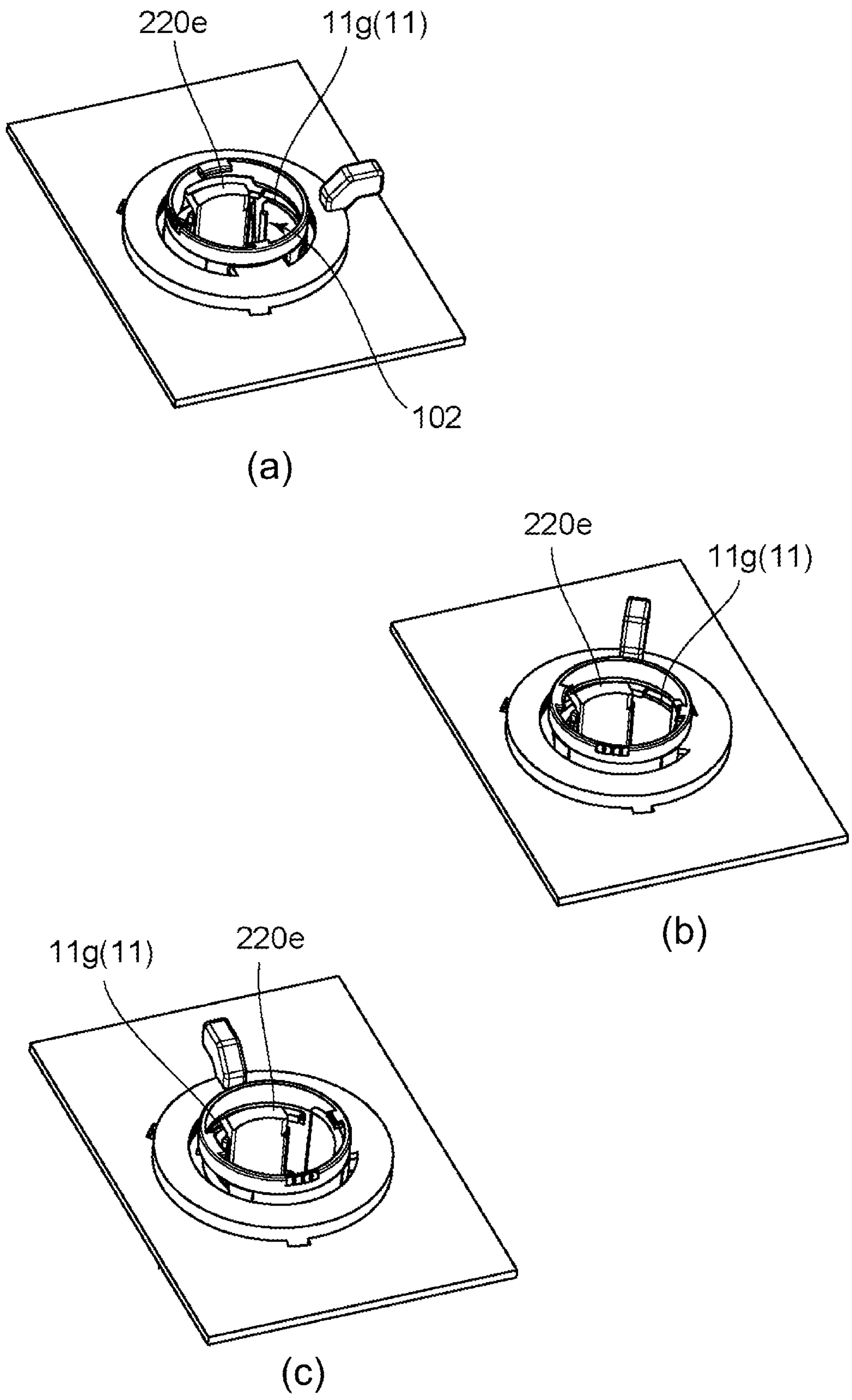
FIG. 21 includes illustrations of a constitution for restricting movement of the toner pack according to the embodiment 1.

FIG. 21 includes illustrations regarding a constitution for restricting before the shutter unit 102 is rotated. Part (b) of FIG. 21 is the illustration during the rotation of the shutter unit 102. Part (c) of FIG. 21 is the illustration after the shutter unit 102 is rotated.

FIG. 21 includes the illustration showing the toner pack 10 in a state in which the toner pack 10 is mounted to the supply portion 200. In FIG. 21, part of the components is omitted.

When the shutter unit 102 is rotated from a state of part (a) of FIG. 21 immediately after the toner pack 10 is mounted to the supply portion 200, the base supporting portion 220 of the toner receiving portion 220 enters the circumferential groove portion 11*g* of the shutter member 11. Here, as shown in part (b) of FIG. 14, the locking claws 11*c* and 11*d* engage with the flange portion 13*s* of the supply base 13, and therefore, the movement of the toner pack 10 in the first direction is restricted. More specifically, upward movement of the toner pack 10 in the first direction is restricted. Accordingly, there is no demounting of the toner pack 10 from the supply portion 200. Further, at the same time, there is no release of contact between the electroconductive portion 14*a* of the memory tag 14 and the connector electrode 250*a* of the connector 250.

Further, in this embodiment, a constitution is employed in which the toner pack 10 is mounted to the supply portion 200 so that the pouch 16 is positioned on an upper side of the vertical direction and the discharge opening 13*a* is positioned on a lower side of the vertical direction. By this, gravity can be utilized for discharging the toner. Further, the pouch 16 is formed in a flexible bag shape, and therefore the toner remaining in the pouch is a small amount by decreasing a volume inside the pouch 16 through a squeeze of the pouch 16 by the user, so that the toner can be discharged efficiently.

When the discharge of the toner is ended, an operating lever is rotated from the state of part (d) of FIG. 20 in the z2 direction by about 90 degrees, so that the discharge opening 13*a* is sealed by the shutter unit 101.

In the toner pack 10 in this embodiment, the discharge opening 13*a* is formed at the side surface of the toner pack 10. In other words, the discharge opening 13*a* is formed at the surface (outer peripheral surface 13*f*) facing the direction crossing the first direction. On the other hand, the electroconductive portion 14*a* (first electrode 14*a*1, second electrode 14*a*2) is disposed on the end surface (surface facing the first direction, surface facing the downstream side with respect to the mounting direction of the toner pack 10) of the toner pack 10. More specifically, the first exposed surface 14*a*11 and the second exposed surface 14*a*21 are disposed on the end surface of the toner pack 10.

By the above-described arrangement of the discharge opening 13*a* and the electroconductive portion 14*a*, compared with the case where both the discharge opening 13*a* and the electroconductive portion 14*a* are disposed on the end surface of the toner pack 10, the discharge opening 13*a* and the electroconductive portion 14*a* can be disposed in the space-saving manner. By the above-described arrangement of the discharge opening 13*a* and the electroconductive portion 14*a*, compared with the case where the electroconductive portion 14*a* is disposed on the side surface of the toner pack 10 and the discharge opening 13*a* is disposed on the end surface, the discharge opening 13*a* or the toner path 13, and the electroconductive portion 14*a* can be disposed in the space-saving manner.

In other words, when a space in which the discharge opening 13*a* and the electroconductive portion 14*a* are disposed is ensured, a necessary space can be downsized. Or, a degree of freedom of arrangement of the discharge opening 13*a* and the electroconductive portion 14*a* can be improved.

Further, when the toner pack 10 is mounted to the image forming apparatus 1, the user supports the supply base 13 (or the shutter unit 102 at a periphery thereof), so that the user can stably mount the toner pack 10 to the image forming apparatus 1. At this time, the electroconductive portion 14*a* is disposed on the end surface of the supply base 13, and therefore, it is possible to suppress the user from touching the electroconductive portion 14*a* of the memory tag 14.

The electroconductive portion 14*a* of the memory tag 14 is disposed on the supply base 13 in a position with respect to crossing (preferably the direction perpendicular to) the first direction and the rotational direction around the rotational axis z. Accordingly, positional deviation between the electroconductive portion 14*a* and the connector electrode 250*a* of the image forming apparatus 1.

Embodiment 2

Next, a second embodiment of the present invention will be described using part (a) of FIG. 22 and part (b) of FIG. 22.

Portions similar to those in the embodiment 1 are represented by the same reference numerals or symbols and will be omitted from detailed description.

In this embodiment, a point such that a memory portion is different in constitution from the memory tag 14 as the memory unit and is constituted as a memory member 24 divided into a plurality of portions is different from the embodiment 1.

Figure 22:
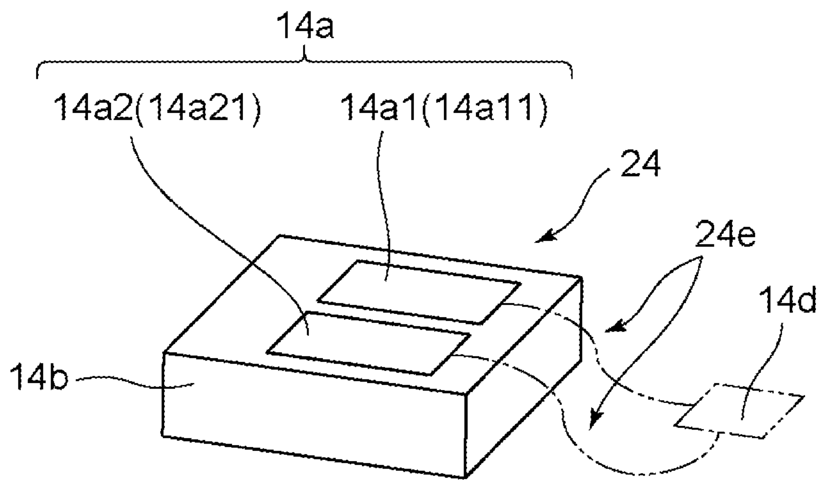
FIG. 22 includes views for illustrating a memory member according to an embodiment 2.
Figure 22:
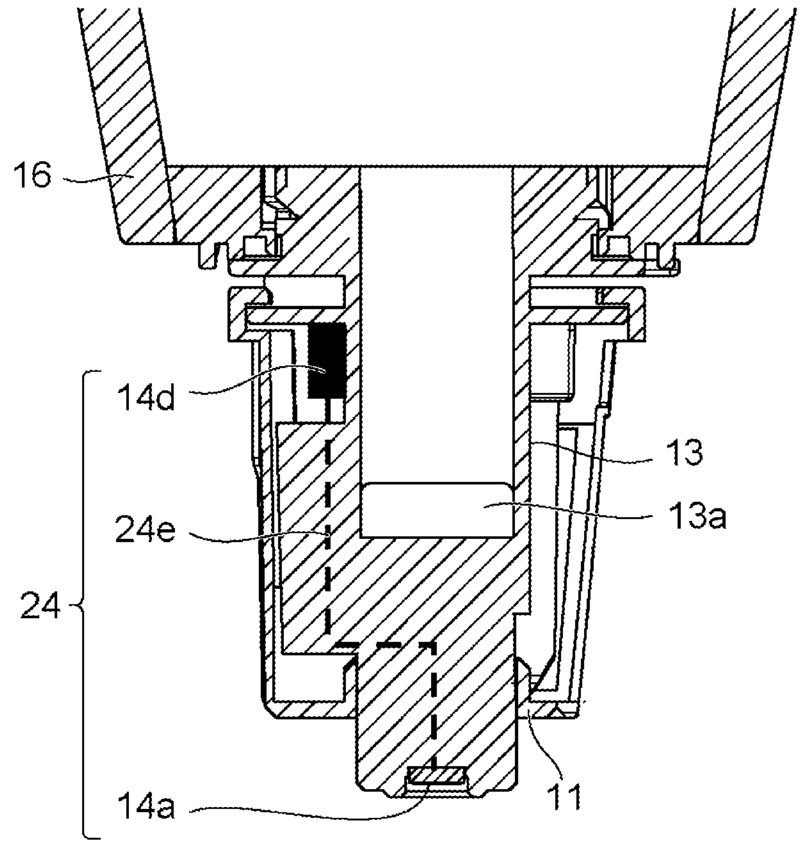

FIG. 22 includes views for illustrating the memory member according to this embodiment. Part (a) of FIG. 22 is the view for illustrating the memory member 24 according to this embodiment. Part (b) of FIG. 22 is the view for illustrating arrangement of the memory member 24.

The memory tag 14 shown in the embodiment 1 was held as a unit of the memory 14*d* and the electroconductive portion 14*a* on a single substrate. However, the memory member 24 in this embodiment is disposed in a position where the memory 14*d* is spaced from the holding portion 14*b* holding the electroconductive portion 14*a* as shown in part (a) of FIG. 22 and part (b) of FIG. 22. The electroconductive portion 14*a* (first electrode 14*al*, second electrode 14*a*2) and the memory 14*d* are electrically connected to each other by an electroconductive path (signal line) 14*e*.

The memory 14*d* in this embodiment is disposed in a space between the supply base 13 and the shutter member 11. On the other hand, the holding portion 14*b* holding the electroconductive portion 14*a* is fixed to the supply base 13 of the toner pack 10 similarly as the memory tag 14 in the embodiment 1.

As described above, in the first embodiment, a memory unit constitution in which the memory portion is provided integrally with the electrode portion 14*a* and the supporting element 14*d* was employed, but in this embodiment, the memory portion 24 which is a separate member is used, so that the memory 14*d* can be disposed in a position spaced from the electroconductive portion 14*a*. Accordingly, a degree of arrangement freedom of the memory 14*d* is enhanced, so that it becomes possible to use the memory 14*d* with a large size.

Modified Embodiment

Figure 23:
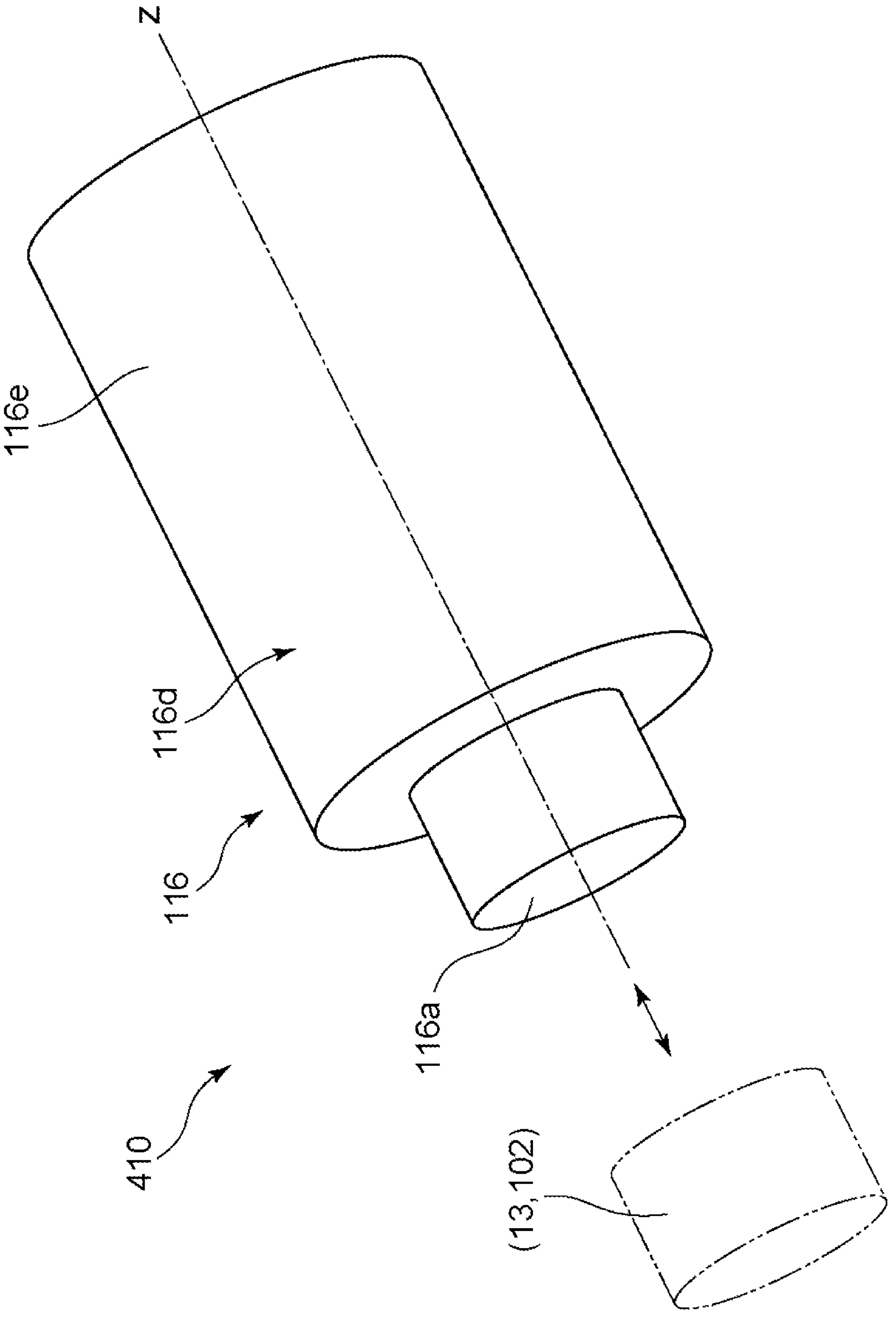
FIG. 23 is an illustration of a container portion according to a modified example.

FIG. 23 is an illustration of a container portion accommodating toner according to a modified embodiment. A shape of the container portion (container) accommodating the toner is not limited to the bag shape such as the pouch 16. For example, as the container portion for accommodating the toner, it is also possible to use a bottle 116 in which a toner accommodating portion is formed.

A toner supply container 410 in this embodiment is provided with the bottle 116, and the supply base 13 and the shutter unit 102 which are shown in the embodiment 1.

The bottle 116 is provided with a wall 116*e* forming an accommodating portion 116*d* accommodating the toner. In the bottle 116, an opening 116*a* for permitting discharge of the toner from the accommodating portion 116*d* is formed. The bottle 116 can be used similarly as the pouch 16 by mounting the supply base 13 shown in the embodiment 1 to the opening 116*a*. Incidentally, the supply base 13 may also be mounted to the bottle 116 via a member such as the expansion member 15.

In this case, the bottle 116 may preferably have flexibility. Further, rigidity of the bottle 116 may preferably be lower than rigidity of the supply base 13. In this embodiment, the toner supply container 410 exhibits an attitude which is the same as the attitude when the toner supply container 410 is mounted to the image forming apparatus 1 and is used, and the bottle 116 is deformed in a state in which the toner is discharged from the discharge opening 13*a*, so that the toner can be discharged. In this case, the bottle 116 may preferably be constituted so that the accommodating portion 116*d* is compressed by 10% or more when a force of 100N or less acts in the direction perpendicular to the rotational axis z at least at a part of the accommodating portion 116*d*. More preferably, the bottle 116 may preferably be deformable so that the accommodating portion 116*d* is compressed by 25% or more (more preferably 50% or more) when a force of 40N or less (more preferably 20N or less) acts in the direction perpendicular to the rotational axis z at least at a part of the accommodating portion 116*d*.

The wall 116*e* of the bottle 116 according to this embodiment may preferably be made of a resin. Further, a thickness of the wall 116*e* may preferably be 1 mm or less, more preferably be 500 μm or less. In this embodiment, a thickness of a wall 14*e* is 100 to 300 μm. As a material of the mall 116*e*, for example, polyethylene terephthalate is preferable.

Other Modified Embodiments

In the above-described embodiments, the developing roller 412 develops the electrostatic latent image in contact with the photosensitive drum 411. However, it is also possible to employ a constitution in which the developing roller 412 develops the electrostatic latent image in a state in which a gap is formed between the developing roller 412 and the photosensitive drum 411.

In the above-described embodiments, the toner remaining on the photosensitive drum 411 is removed (cleaning) by the cleaning unit 413. However, it is also possible to employ a constitution in which the toner remaining on the photosensitive drum 411 is collected in the accommodating portion 418 via the developing roller 412.

In the above-described embodiments, as the developer, the non-magnetic one-component developer can be used. However, a developer other than the non-magnetic one-component developer can also be used. For example, a magnetic one-component developer or a two-component developer can also be used.

Further, the container portion such as the pouch 16 or the bottle 116, and the supply base 13 may also be integrally formed.

INDUSTRIAL APPLICABILITY

According to the present invention, there is provided a toner supply container and a mounting unit capable of being mounted to a container portion for accommodating toner.

The present invention is not restricted to the foregoing embodiments, but can be variously changed and modified without departing from the spirit and the scope of the present invention. Accordingly, the following claims are attached hereto to make public scope of the present invention.

This application claims the Conventional Priority based on Japanese Patent Application 2020-187416 filed Nov. 10, 2020, all disclosure of which is incorporated by reference herein.

The invention claimed is:

1. A toner supply container comprising:

a memory portion including a memory for storing information and an electroconductive portion including an electrode electrically connected to the memory;

a container portion for accommodating toner;

a discharging portion provided on one end side of the container with respect to a first direction and including a discharge opening which opens toward a second direction that crosses the first direction and which is for permitting discharge of the toner; and a shutter configured to be rotated around an axis extending in the first direction, the shutter being movable between a closed position where the shutter covers the discharge opening and a retracted position where the shutter is retracted from the closed position, wherein the electrode has an exposed surface exposed to outside of the toner supply container and is provided so that the exposed surface faces the first direction, and wherein, as viewed along the first direction, the exposed surface is disposed inside of an imaginary circle that passes through an outer end of the shutter with the axis as a center of the imaginary circle, and wherein the shutter includes a crossing wall extending in the second direction and the shutter is provided with a through hole through which the exposed surface is exposed.

2. A toner supply container according to claim 1, wherein the shutter includes an opposing portion where the shutter opposes the discharge opening when the shutter is in the closed position, and wherein, as viewed along the first direction, the exposed surface is disposed inside of an imaginary circle that passes through the opposing portion with the axis as a center of the imaginary circle.

3. A toner supply container according to claim 1, wherein, as viewed along the first direction, the exposed surface is disposed inside of an imaginary circle that passes through an inner end of the shutter with the axis as a center of the imaginary circle.

4. A toner supply container according to claim 1, wherein, with respect to the first direction, the crossing wall is disposed between the electrode and the discharge opening.

5. A toner supply container according to claim 1, wherein the discharging portion includes a positioning portion for positioning the electrode so that the exposed surface faces the first direction and a projected portion projects in the first direction, with the projected portion including the positioning portion, and wherein the projected portion is inserted into the through hole.

6. A toner supply container according to claim 5, wherein the projected portion includes a projected wall extending in the second direction.

7. A toner supply container according to claim 1, wherein the discharging portion includes a positioning portion for positioning the electrode so that the exposed surface faces the first direction.

8. A toner supply container according to claim 1, wherein the electrode is a first electrode and the exposed surface is a first exposed surface, and wherein the electroconductive portion includes a second electrode electrically connected to the memory, and the second electrode includes a second exposed surface exposed to outside of the toner supply container.

9. A toner supply container according to claim 8, wherein, as viewed along the first direction, the axis is disposed between the first exposed surface and the second exposed surface.

10. A toner supply container according to claim 1, wherein the discharging portion includes a toner path which is connected to the discharge opening and along which the toner passes, and wherein, as viewed along the first direction, the exposed surface and the toner path overlap with each other.

11. A toner supply container according to claim 10, wherein the toner path includes a guide surface which is inclined relative to the first direction and which opposes the discharge opening, and wherein, as viewed along the first direction, the exposed surface and the guide surface overlap with each other.

12. A toner supply container according to claim 1, wherein the container portion has flexibility, and rigidity of the container portion is lower than rigidity of the discharging portion.

13. A mounting unit mountable to a container for accommodating toner, comprising:

a memory portion including a memory for storing information and an electroconductive portion including an electrode electrically connected to the memory;

a container portion for accommodating toner;

a discharging portion provided on one end side of the container with respect to a first direction and including a discharge opening which opens toward a second direction that crosses the first direction and which is for permitting discharge of the toner; and a shutter configured to be rotated around an axis extending in the first direction, the shutter being movable between a closed position where the shutter covers the discharge opening and a retracted position where the shutter is retracted from the closed position, wherein the electrode has an exposed surface exposed to outside of the toner supply container and is provided so that the exposed surface faces the first direction, and wherein, as viewed along the first direction, the exposed surface is disposed inside of an imaginary circle that passes through an outer end of the shutter with the axis as a center of the imaginary circle, and wherein the shutter includes a crossing wall extending in the second direction and the shutter is provided with a through hole through which the exposed surface is exposed.

14. A toner supply container according to claim 13, wherein the shutter includes an opposing portion where the shutter opposes the discharge opening when the shutter is in the closed position, and wherein, as viewed along the first direction, the exposed surface is disposed inside of an imaginary circle that passes through the opposing portion with the axis as a center of the imaginary circle.

15. A toner supply container according to claim 13, wherein, as viewed along the first direction, the exposed surface is disposed inside of an imaginary circle that passes through an inner end of the shutter with the axis as a center of the imaginary circle.

16. A toner supply container according to claim 13, wherein, with respect to the first direction, the crossing wall is disposed between the electrode and the discharge opening.

17. A toner supply container according to claim 13, wherein the discharging portion includes a positioning portion for positioning the electrode so that the exposed surface faces the first direction and a projected portion projects in the first direction, with the projected portion including the positioning portion, and wherein the projected portion is inserted into the through hole.

18. A toner supply container according to claim 17, wherein the projected portion includes a projected wall extending in the second direction.

19. A toner supply container according to claim 13, wherein the discharging portion includes a positioning portion for positioning the electrode so that the exposed surface faces the first direction.

20. A toner supply container according to claim 13, wherein the electrode is a first electrode and the exposed surface is a first exposed surface, and wherein the electroconductive portion includes a second electrode electrically connected to the memory, and the second electrode includes a second exposed surface exposed to outside of the toner supply container.

21. A toner supply container according to claim 20, wherein, as viewed along the first direction, the axis is disposed between the first exposed surface and the second exposed surface.

22. A toner supply container according to claim 13, wherein the discharging portion includes a toner path which is connected to the discharge opening and along which the toner passes, and wherein, as viewed along the first direction, the exposed surface and the toner path overlap with each other.

23. A toner supply container according to claim 22, wherein the toner path includes a guide surface which is inclined relative to the first direction and which opposes the discharge opening, and wherein, as viewed along the first direction, the exposed surface and the guide surface overlap with each other.

* * * * *